(12) United States Patent
Frei et al.

(10) Patent No.: US 10,142,107 B2
(45) Date of Patent: Nov. 27, 2018

(54) TOKEN BINDING USING TRUST MODULE PROTECTED KEYS

(71) Applicant: Microsoft Technology Licensing, LLC., Redmond, WA (US)

(72) Inventors: Adrian Frei, Seattle, WA (US); Tarek B. Kamel, Issaquah, WA (US); Guruprasad B. Aphale, Bothell, WA (US); Sankara Narayanan Venkataraman, Bellevue, WA (US); Xiaohong Su, Redmond, WA (US); Yordan Rouskov, Seattle, WA (US); Vijay G. Bharadwaj, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 155 days.

(21) Appl. No.: 14/986,388

(22) Filed: Dec. 31, 2015

(65) Prior Publication Data

US 2017/0195121 A1 Jul. 6, 2017

(51) Int. Cl.
*H04L 29/06* (2006.01)
*H04L 9/32* (2006.01)
*H04L 9/08* (2006.01)

(52) U.S. Cl.
CPC .......... *H04L 9/3213* (2013.01); *H04L 9/0825* (2013.01); *H04L 9/0841* (2013.01);
(Continued)

(58) Field of Classification Search
CPC . H04L 9/3213; H04L 63/0807; H04L 9/0841; H04L 9/3242; H04L 63/0435; H04L 9/0869
See application file for complete search history.

(56) References Cited

U.S. PATENT DOCUMENTS 7,370,350 B1 * 5/2008 Salowey ............... G06F 21/445
380/259
7,590,867 B2 9/2009 Scarlata et al.
(Continued)

OTHER PUBLICATIONS

Carbin, Paul, "Intel® Identity Protection Technology-based Token Provider for RSA SecurID* Software Token for Microsoft Windows", Published on: Jun. 8, 2015, Available at: https://software.intel.com/en-us/articles/intel-identity-protection-technology-based-token-provider.

(Continued)

*Primary Examiner* — Tri M Tran
(74) *Attorney, Agent, or Firm* — Merchant & Gould

(57) ABSTRACT

Binding a security token to a client token binder, such as a trusted platform module, is provided. A bound security token can only be used on the client on which it was obtained. A secret binding key ($k_{bind}$) is established between the client and an STS. The client derives a key ($k_{mac}$) from $k_{bind}$, signs a security token request with $k_{mac}$, and instructs the STS to bind the requested security token to $k_{bind}$. The STS validates the request by deriving $k_{mac}$ using a client-provided nonce and $k_{bind}$ to MAC the message and compare the MAC values. If the request is validated, the STS generates a response comprising the requested security token, derives two keys from $k_{bind}$: one to sign the response and one to encrypt the response, and sends the response to the client. Only a device comprising $k_{bind}$ is enabled to use the bound security token, providing increased security.

20 Claims, 18 Drawing Sheets

(52) U.S. Cl.
CPC .......... *H04L 9/0869* (2013.01); *H04L 9/3242* (2013.01); *H04L 63/0428* (2013.01); *H04L 63/0435* (2013.01); *H04L 63/0807* (2013.01); *H04L 2463/061* (2013.01)

(56) References Cited

U.S. PATENT DOCUMENTS

| | | | |
|---|---|---|---|
| 7,664,965 | B2 | 2/2010 | Bade et al. |
| 7,870,399 | B2 | 1/2011 | Bryant et al. |
| 8,032,741 | B2 | 10/2011 | Smith |
| 8,418,235 | B2 * | 4/2013 | Sherkin ................. H04L 63/083 726/17 |
| 8,453,236 | B2 | 5/2013 | Seifert et al. |
| 8,595,483 | B2 | 11/2013 | Rozas |
| 8,615,788 | B2 | 12/2013 | Berger et al. |
| 2003/0093694 | A1 * | 5/2003 | Medvinsky .......... G06Q 20/367 726/6 |
| 2006/0026422 | A1 | 2/2006 | Bade et al. |
| 2008/0244261 | A1 | 10/2008 | Wiseman et al. |
| 2009/0300168 | A1 | 12/2009 | Guo et al. |
| 2010/0042824 | A1 * | 2/2010 | Lee ..................... G06F 21/6218 713/2 |
| 2012/0102553 | A1 | 4/2012 | Hsueh et al. |
| 2014/0032920 | A1 | 1/2014 | Gehrmann et al. |
| 2014/0281506 | A1 | 9/2014 | Redberg et al. |
| 2015/0264021 | A1 * | 9/2015 | Schulz ................ H04L 63/0414 713/170 |

OTHER PUBLICATIONS

"Token Binding (tokbind)", Retrieved on: Oct. 6, 2015 Available at: https://datatracker.ietf.org/wg/tokbind/charter/.

* cited by examiner

MOBILE COMPUTING DEVICE

TOKEN BINDING USING TRUST MODULE PROTECTED KEYS

BACKGROUND

In a networked computing environment, a web application may use a trusted security token service to handle identification and authentication of client users, and to issue security tokens comprising identity claims required by the web application.

When a requesting client user is successfully authenticated, the security token service provides the client user with a ticket-granting-ticket (TGT) that is encrypted with a private key owned by the security token service, and can be used to obtain individual service tokens for sessions with services on a network without the user having to enter a password each time the user wishes to connect with a service. TGTs are often persisted on the user's computing device. If a TGT is compromised, an attacker can masquerade as the user until the TGT expires. Oftentimes, TGTs are relatively long-lived to provide users with a good user experience, which makes TGTs a prime target for an attacker.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for binding a security token, such as a ticket-granting-ticket (TGT) or service token, to at least one token binder such that the security token can only be used on a device on which it was obtained. According to examples, a binding key is established between a client token binder and a security token service, wherein the binding key is a shared secret between the client and the security token service. When the client makes a request for a TGT or a service token from the security token service, the client token binder derives a first key from the binding key, signs the request with the first derived key, and instructs the security token service to bind the requested security token to the binding key. As is known in the art, asymmetric cryptography operations are computationally intensive and impact system resource usage. By using a cryptographic checksum operation for the binding aspects, which is less expensive than asymmetric encryption operations, the computational load of signing the request message with a derived key is decreased. Accordingly, processing speed in improved, battery life is preserved, and user experience is improved by minimizing operation delays.

When the security token service receives the request, the security token service validates the request by deriving the first key using a client-provided nonce value and the binding key to generate a Message Authentication Code (MAC) of the message and compare the MAC values. If the request is validated and the client is authenticated, the security token service generates a response message comprising the requested security token, derives a second key from the binding key to sign the response message, derives a third key from the binding key to encrypt the response message, and sends the response to the client. As stated above, only a device comprising the binding key is enabled to use the bound security token, providing increased security.

In some examples, multiple token binders associated with a client can be chained to bind a security token to more than one token binder. Each token binder comprises a binding key, which is either derived from a master binding key or individually generated. A first token binder derives an intermediate key from a binding key secured by the first token binder and a nonce value, and passes the intermediate key to a second token binder as an input with the second token binder's binding key to derive a chained signing key for a request message.

In response, the security token service derives a chaining key from the two binding keys to sign the response message comprising a requested security token, and derives a chaining key from the binding key to encrypt the response message comprising the requested security token. Accordingly, security is increased, as an attacker must circumvent more than one token binder to attempt to obtain the binding key. Additionally, flexibility is increased as a different combination of token binders can be used.

Also, the client is enabled to provide a service provider with a range of claims to services depending on the token binders to which a security token is bound. For example, if a security token is bound to a trusted platform module and a client licensing platform, one claim in the token can indicate to the service provider the protection level the client has according to the particular trusted platform module, enabling the service provider to expose certain functionality to clients comprising an attested trusted platform module, and another claim in the token can indicate licensing information to the service provider, enabling the service provider to expose certain functionality to clients running on a licensed operating system.

Examples are implemented as a computer process, a computing system, or as an article of manufacture such as a device, computer program product, or computer readable media. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
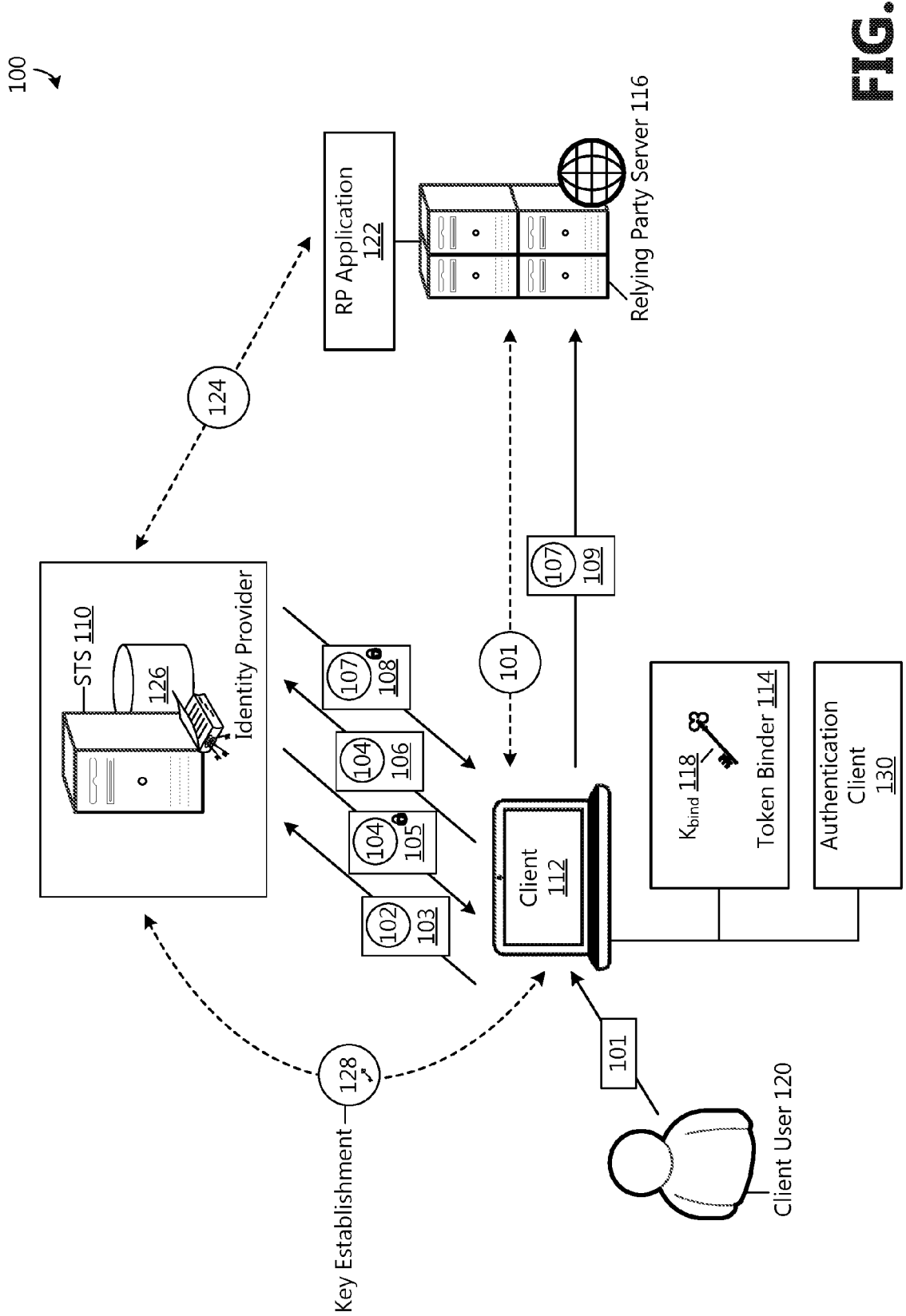
FIG. 1 is a block diagram showing components of an example token-based authentication system.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method and system for binding a security token to at least one token binder embodied as a trusted platform module, a virtual trusted platform module, or a client licensing platform associated with a client. With reference now to FIG. 1, a block diagram of one example of a token-based authentication system 100 is shown. A token-based authentication system 100 can be used for federated authentication, where authentication is performed by a trusted third party identity provider. According to examples, the trusted third party identity provider is a security token service (STS) 110. The STS 110 is illustrative of a software module, system, or device that is operative to authenticate a client user 120 of a client device (herein referred to as a client 112). The STS 110 is further operative to build, sign, and issue security tokens for enabling the client 112 to communicate with various protected network resources and services, herein referred to as relying party applications (RP) 122 executing on one or more relying party servers 116. For example, an RP 122 may include file and print servers, database servers, web applications, web services, etc. In some examples, the RP 122 is a claims-based application that requires certain claims (e.g., username, email address, role memberships) for identity-related tasks. According to examples, a trust is pre-established between the STS 110 and the RP 122.

According to examples, the client 112 comprises an authentication client 130, operative to provide cryptographic operations (e.g., decryption, encryption, random number generation, authentication). Components included in an example authentication client 130 are described below with reference to FIG. 2.

Figure 2:
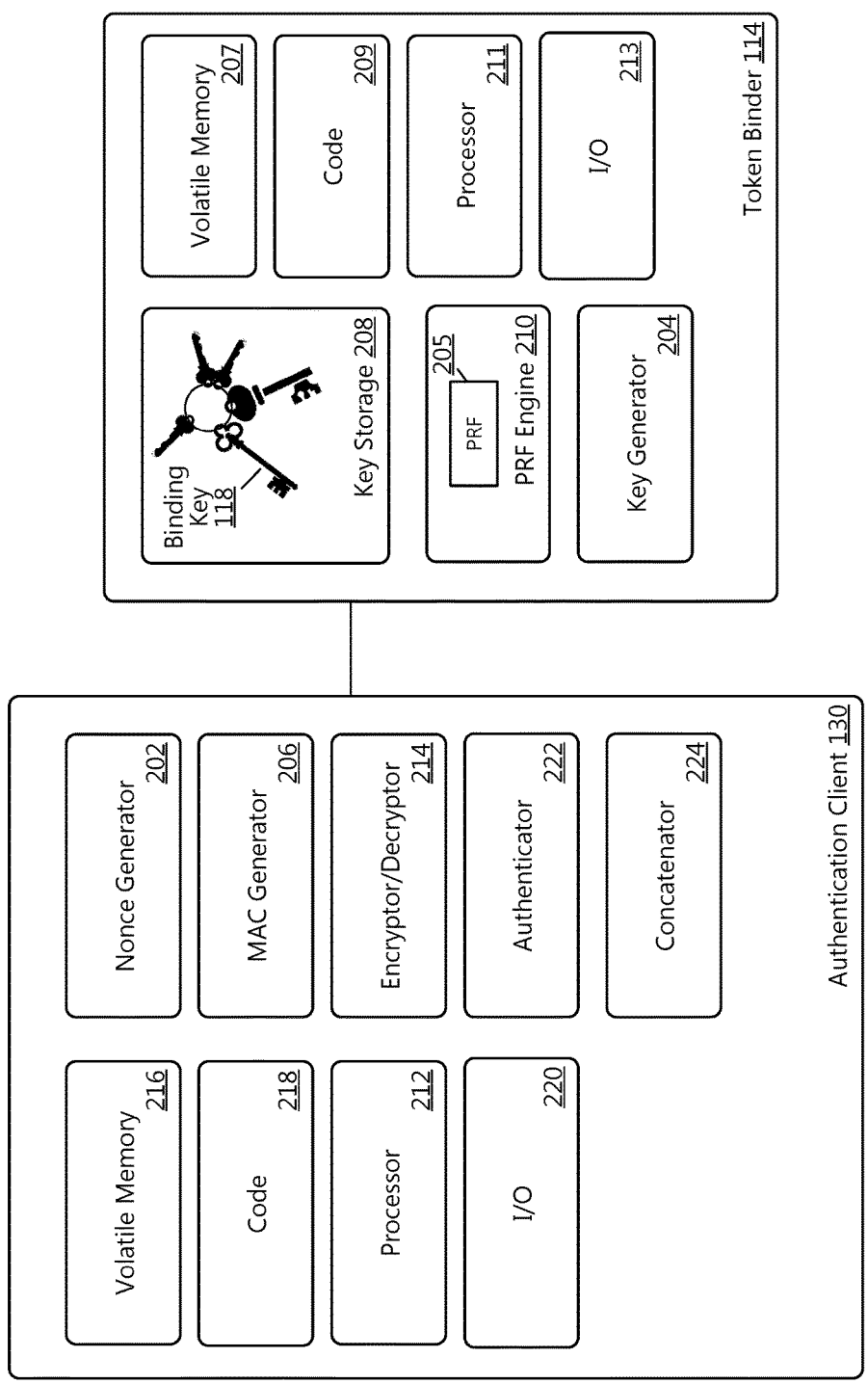
FIG. 2 is a block diagram illustrating components of an example token binder embodied as a trusted platform module and an example authentication client.

According to examples, the client 112 comprises at least one token binder 114, which is illustrative of a software module or a hardware system or device physically and operatively attached to the client 112 operative to securely store cryptographic keys. In some examples, the token binder 114 is embodied as a trusted platform module (TPM). Components of an example token binder 114 embodied as a trusted platform module (TPM) are illustrated in FIG. 2 and described below with reference to FIG. 2.

In other examples, the token binder 114 is embodied as a virtual TPM (vTPM), which is illustrative of a hardware system or device physically and operatively attached to a virtual machine or a software module running on a virtual machine operative to provide TPM services to the virtual machine running on top of a hypervisor, which emulates a client's 112 central processing unit (CPU), memory, hard disk, network, and other hardware resources.

In other examples, the token binder 114 is embodied as a client licensing platform (CLiP), which is illustrative of a heavily obfuscated software module operative to ensure an application or operating system is properly licensed.

According to an aspect, the token binder 114 is operative to securely store a binding key 118, which is a secret key that is known only to the token binder 114 and the STS 110 and cannot be extracted from the token binder 114. Accordingly, a key establishment transaction 128 occurs between the client 112 and the STS 110. According to an example, the binding key 118 is established out-of-band, for example, at manufacturing time of the token binder 114, and is shared with the STS 110 as part of an enrollment process of the client 112. For example, if the token binder 114 is a TPM, the binding key 118 may be burned into the TPM at the time of production of the TPM.

According to another example, the binding key 118 is established during initial authentication. For example, when a client 112 sends an authentication request to the STS 110, the client 112 may include a request for a binding key 118. To provide secure transmission of the binding key 118 to the client 112, the client 112 may send the token binder's 114 public storage key to the STS 110 in the request for the binding key 118, which the STS 110 uses to send the binding key 118 to the client 112 encrypted with the token binder's public storage key that only the token binder 114 can decrypt using the token binder's private storage key.

According to another example, the binding key 118 is established prior to authentication. For example, the STS 110 may send an encrypted binding key 118 to the client 112 in response to a request for the binding key 118. According to an aspect, the binding key 118 is used as keying material to generate pseudorandom keys. According to another aspect, the binding key 118 is used in conjunction with secure algorithms to create message authentication codes (MACs). According to another example, the binding key 118 is used to perform both encryption and decryption.

Referring still to FIG. 1, in some examples, a first RP service access attempt 101 is made by a client 112, wherein the client user 120 has not yet been authenticated or the client 112 is not in possession of a security token for the requested service. Accordingly, the RP 122 redirects the client 112 to the STS 110 for authentication and/or to obtain a security token for access to the service provided by the RP 122. In some examples, the RP 122 exposes a policy to the client 112. For example, the policy may include a list of claims that the RP 122 needs, such as the client user's user name, email address, role memberships, etc., requirement for a type or types of credential needed, how often the client user 120 needs to re-enter the credential, etc. The client 112 can then include the required claims in a request for a security token for the service to the STS 110. In other examples, the RP 122 transmits the policy directly to the STS 110 in an initial trust establishment process 124.

Either at login or when the client 112 is redirected to the STS 110, the client user 120 presents credentials 102 to the STS 110, which the client 112 includes in an authentication request 103. The STS 110 is in communication with an identity store 126, which stores and manages identities of entities (e.g., client 112, client user 120), their associated attributes (e.g., user roles, security groups), and keys. According to an aspect, the identity store 126 is operative to store one or more binding keys 118 associated with an entity.

The STS 110 is operative to authenticate the client user 120, and query the identity store 126 for determining what resources the authenticated user 120 is allowed to access and what operations are allowed to be performed on those resources, for example, based on user roles. This authorization information is included in a ticket-granting-ticket (TGT) 104. A TGT 104 is an authentication token that is used to obtain individual security tokens for different services, for example, services provided by RPs 122. According to an aspect, a TGT 104 includes a start time and an expiration time, and may have a relatively long lifetime to provide a single sign-on session to the client user 120, where the client user 120 is not required to reenter his/her credentials 102 to access various services during a single session.

According to an aspect, to protect the TGT 104 from malware or use outside of the client 112, the client 112 signs the authentication request 103 with a key derived from the binding key 118, and instructs the STS 110 to bind the TGT 104 to the key derived from the binding key 118. Accordingly, the bound TGT 104 can only be used by the client 112 in possession of the key. The STS 110 is operative to send the TGT 104 in a response 105 to the client 112, wherein the response 105 comprising the TGT 104 is encrypted with the key derived from the binding key 118.

Once the response 105 is received and decrypted, the client 112 includes the TGT 104 in a service token request 106, and transmits the service token request 106 to the STS 110 requesting a service token 107 representing the identity of the client user 120 and enabling access to an RP 122. According to an aspect, to protect the TGT 104 from malware or use outside of the client 112, the client 112 signs the service token request 106 with a key derived from the binding key 118, and instructs the STS 110 to encrypt the service token 107 with a key derived from the binding key 118, such that the response cannot be decrypted without the binding key 118. According to an aspect, since the TGT 104 is bound to the client 112, it can only be used when possession of the binding key 118 is proven (e.g., by decryption). Accordingly, every service token 107 returned based on a bound TGT 104 must be returned in an encrypted response. In some examples, the client 112 is able to include a request for a TGT 104 and a service token 107 in a same request, thus reducing network traffic.

If the client user 120 is authorized to access the requested RP 122, the STS 110 generates a service token 107, and sends the service token 107 in a response 108 to the client 112, wherein the response 108 comprising the service token 107 is encrypted with the key derived from the binding key 118, and wherein the service token 107 includes information that provides the RP 122 with claims it needs to provide services to the user 120.

The client 112 is enabled to make a request 109 to the RP 122 including the security token 107 issued by the STS 110. If the RP 122 understands the security token 107 and finds the claims it needs to authenticate and authorize the user 120, it provides the protected resource to the client 112.

With reference now to FIG. 2, components of an example token binder 114 embodied as a TPM and components of an example authentication client 130 are illustrated. According to an aspect, the token binder 114 includes a key storage 208 operative to securely store keys, including the binding key 118.

According to an aspect, the token binder 114 includes at least one processor 211, a volatile memory 207 coupled to the at least one processor 211, and code 209 which is executable by the processor 211 to cause: a pseudorandom function (PRF) engine 210 to store PRFs 205, such as cryptographic functions or MAC functions, and provide an appropriate PRF 205 to a key generator 204 to generate cryptographically strong keys derived from the binding key 118.

According to an aspect, the key generator 204 is illustrative of a software module, system, or device operative to construct a key derivation function (KDF) using a pseudo-random function (PRF) 205 seeded by the binding key 118 for deriving cryptographically strong keys, for example, a key for authenticating a message, or for encrypting or decrypting a message. According to an example, the key generator 204 is operative to construct a KDF using a keyed-hash message authentication code (HMAC) PRF or a symmetric key cipher.

The token binder 114 further includes a secure Input/Output (I/O) interface 213 to manage communications and route messages to the appropriate token binder 114 and/or authentication client 130 component.

According to an aspect, the authentication client 130 includes at least one processor 212, a volatile memory 216 coupled to the at least one processor 212, and code 218 which is executable by the processor 212 to cause: a nonce generator 202 to generate nonces; a MAC generator 206 to build MACs using keys stored or generated by the token binder 114; an encryptor/decryptor 214 to encrypt and decrypt messages using keys stored or generated by the token binder 114; an authenticator 222 to verify the integrity of a received input message; a concatenator 224 to concatenate MACs, messages, and nonces, and a secure I/O interface 220 to manage communications and route messages to the appropriate authentication client 130 and/or token binder 114 component.

According to an aspect, the nonce generator 202 is illustrative of a software module, system, or device that is operative to generate nonce values for key derivation, wherein each nonce value may only be used once with a given key. In some examples, the nonce generator 202 is a hardware random number generator operative to generate a random number. In some examples, the nonce generator 202 is a pseudorandom number generator, for example, a software module operative to generate random numbers using a deterministic algorithm to produce numerical sequences for use as nonce values.

The MAC generator 206 is illustrative of a software module, system, or device operative to take in an input message comprised of variable-sized input data, apply a key derived from the binding key 118, and generate a fixed-size output (a MAC) as output, from which it is computationally infeasible to recreate the input data. Since the output depends on all the bits in the input message, any alteration of the input message during transmission causes the MAC to differ from its original output, and can be used to check for forgeries, unauthorized alterations, etc. According to an example, the MAC is generated using a MAC function, such as SHA-256, in combination with a key derived from the binding key 118. While MACs are oftentimes generated with hashes using a hash-based MAC algorithm (HMAC), MACs can be generated using other symmetric key algorithms, such as block ciphers (e.g., AES-CMAC). MAC values are both generated (by the client 112) and verified (by the STS 110) using the same secret key (i.e., the key derived from the binding key 118).

The encryptor/decryptor 214 is illustrative of a software module, system, or device operative to encrypt or decrypt messages using a key, such as the binding key 118, a key derived from the binding key 118, or a client private key.

The authenticator 222 is illustrative of a software module, system, or device operative to verify the integrity of a received input message by comparing a received MAC generated by the STS 110 to a client-side calculated MAC. Since a MAC depends on all the bits in the input message, any alteration (e.g., forgeries, unauthorized alterations) of the input message during transmission would cause the client-side calculated MAC to not match with its original STS-calculated MAC. If the MACs match, the message authenticator 222 is operative to authenticate the input message as coming from the alleged sender (STS 110).

Figure 3A:
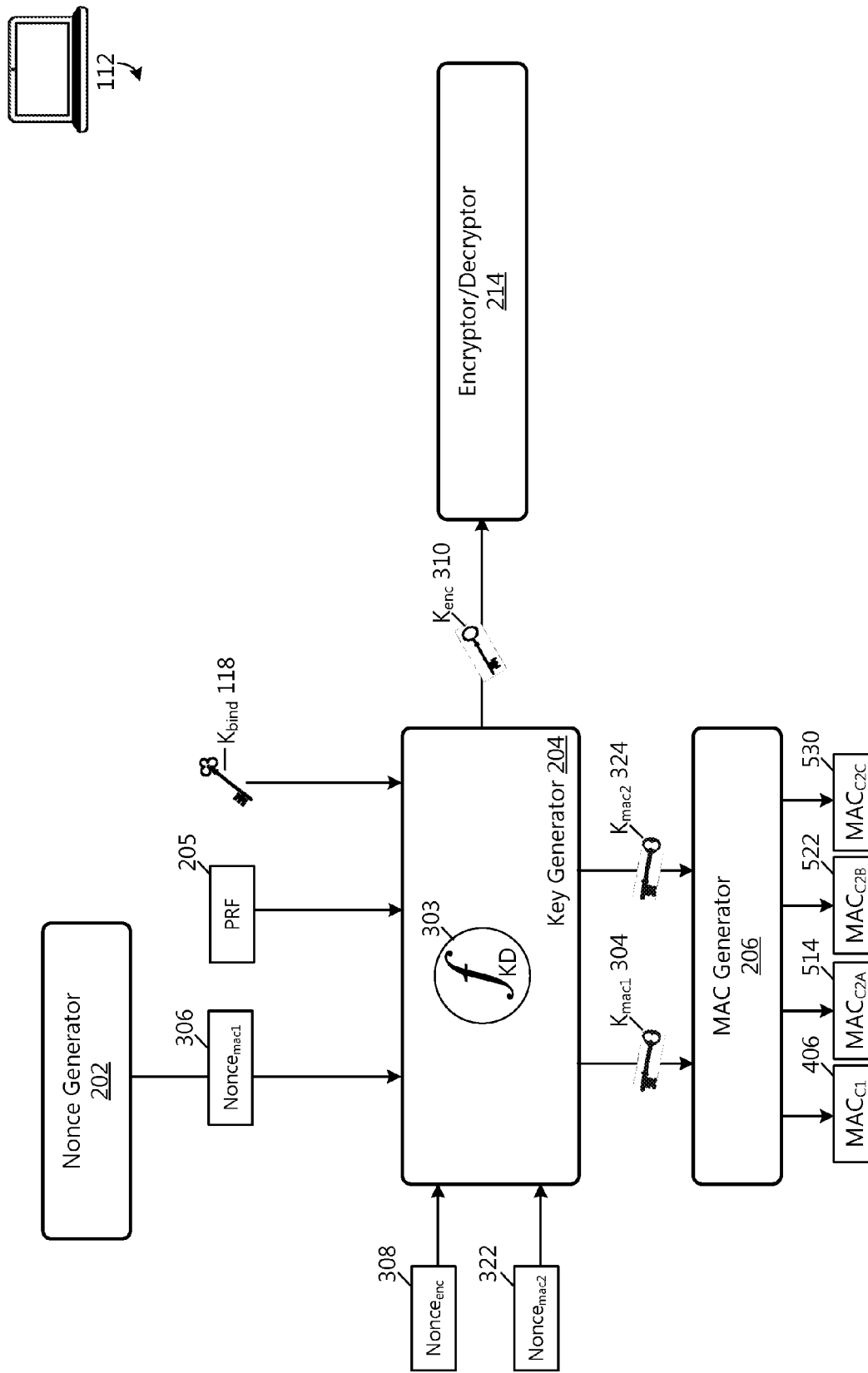
FIG. 3A is a block diagram illustrating client-side key derivation examples.

With reference now to FIG. 3A, a block diagram illustrating client-side key derivation examples is shown. As illustrated, the nonce generator 202 produces values as nonces for key generation. In some examples, a nonce is a cryptographically secure (pseudo)random number. In other examples, a nonce is a timestamp.

The nonce generator 202 outputs a nonce (nonce$_{mac1}$ 306) to the key generator 204. According to an aspect, the key generator 204 constructs a KDF 303, wherein the KDF 303 is a deterministic algorithm used to derive cryptographic keying material from a secret value, such as the binding key 118. The KDF 303 is defined by a choice of a PRF 205 provided by the token binder 114, such as an HMAC PRF or a symmetric key cipher. For example, the key generator 204 applies the PRF 205 to the binding key 118 along with the nonce$_{mac1}$ 306, and produces a first derived key ($k_{mac1}$ 304), which can be used as a cryptographic key in subsequent authentication operations. For example, the key generator 204 is operative to output $k_{mac1}$ 304 to the MAC generator 206 for generating a MAC output ($MAC_{C1}$ 406) as described below with respect to FIG. 4.

The key generator 204 is further operative to produce a second derived key ($k_{enc}$ 310). According to an aspect, the key generator 204 inputs the PRF 205, the binding key 118, and an STS-provided nonce value (nonce$_{enc}$ 308) into the KDF 303, and derives $k_{enc}$ 310, which can be used as a cryptographic key in a subsequent decryption operation. For example, the key generator 204 is operative to output $k_{enc}$ 310 to the encryptor/decryptor 214 for a subsequent decryption operation of a response message ($M_R$) or of a concatenation ($M_R$||MAC($M_R$)) as described below with respect to FIGS. 5A, 5B, and 5C.

The key generator 204 is further operative to produce a third derived key ($k_{mac2}$ 324). For example, the key generator 204 applies the PRF 205 to the binding key 118 along with an STS-provided nonce value (nonce$_{mac2}$ 322), and produces a derived key ($k_{mac2}$ 324), which can be used as a cryptographic key in subsequent authentication operations. For example, the key generator 204 is operative to output $k_{mac2}$ 324 to the MAC generator 206 for generating a MAC output ($MAC_{C2A}$ 514, $MAC_{C2B}$ 522, or $MAC_{C2C}$ 530) to authenticate a response message ($M_R$) as described below with respect to FIGS. 5A, 5B, and 5C.

Figure 3B:
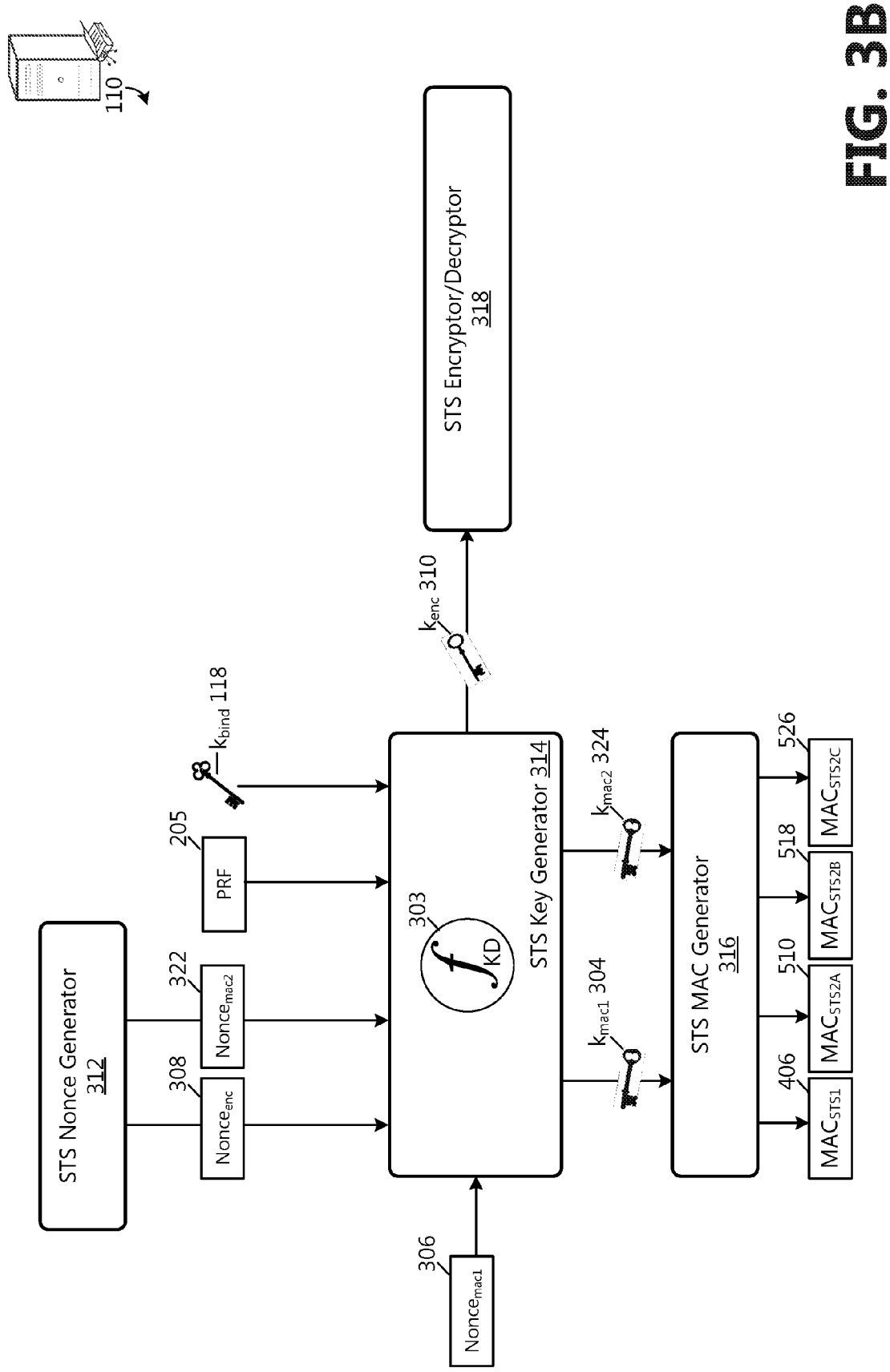
FIG. 3B is a block diagram illustrating server-side key derivation examples.

With reference now to FIG. 3B, a block diagram illustrating server-side key derivation examples is shown. According to an aspect, the STS 110 comprises an STS nonce generator 312, an STS key generator 314, an STS MAC generator 316, and an STS encryptor/decryptor 318.

The STS nonce generator 312 is illustrative of a software module, system, or device operative to generate nonce values for key derivation, wherein each nonce value may only be used once with a given key. For example, the STS nonce generator 312 is operative to generate a first nonce value (nonce$_{enc}$ 308), and output nonce$_{enc}$ 308 to the STS key generator 314 for derivation of a key from the binding key 118 for enciphering a response message ($M_R$). As another example, the STS nonce generator 312 is operative to generate a second nonce value (nonce$_{mac2}$ 322) for derivation of a key from the binding key 118 for generating a MAC for a response message ($M_R$).

In some examples, the STS nonce generator 312 is a hardware random number generator operative to generate a random number. In some examples, the STS nonce generator 312 is a pseudorandom number generator, for example, a software module operative to generate random numbers using a deterministic algorithm to produce numerical sequences for use as a nonce values.

The STS key generator 314 is illustrative of a software module, system, or device operative to derive keys by constructing a KDF 303 using a PRF 205, the shared secret binding key 118, and a nonce value as inputs. According to an example, the STS key generator 314 is operative to derive a first key ($k_{mac1}$ 304) using the PRF 205 provided by the client 112, the binding key 118, and nonce$_{mac1}$ 306 generated and provided by the client 112. For example, the client 112 may share the PRF 205 used to derive $k_{mac1}$ 304 with the STS 110 in a separate step, for example, when the binding key 118 is established between the client 112 and the STS 110. According to an example, the STS key generator 314 provides $k_{mac1}$ 304 as an output to the STS MAC generator 316 for use in an authenticating operation of a received request message (M) described below with respect to FIG. 4.

According to another example, the STS key generator 314 is further operative to construct a KDF 303 using the PRF 205, the binding key 118, and nonce$_{enc}$ 308 generated by the STS nonce generator 312 as inputs to generate a second cryptographic key ($k_{enc}$ 310). According to an example, the STS key generator 314 provides $k_{enc}$ 310 as an output to the STS encryptor/decryptor 318 for use in a ciphering operation described below with respect to FIGS. 5A, 5B, and 5C.

According to another example, the STS key generator 314 is further operative to generate a third cryptographic key ($k_{mac2}$ 324) from a KDF 303 using the PRF 205, the binding key 118, and nonce$_{mac2}$ 322 generated by the STS nonce generator 312 as inputs. According to an example, the STS key generator 314 provides $k_{mac2}$ 324 as an output to the STS MAC generator 316 for use in an authenticating operation of a response message ($M_R$) described below with respect to FIGS. 5A, 5B and 5C.

The STS MAC generator 316 is illustrative of a software module, system, or device operative to generate a MAC of an input message comprised of variable-sized input data. According to an example, the STS MAC generator 316 is operative to take in a received request message (M), apply a first key derived from the binding key 118 ($k_{mac1}$ 304) and a first nonce value (nonce$_{mac1}$ 306) provided by the client 112 as inputs to a symmetric key MAC function (MAC)

(e.g., AES-CMAC, MD5, SHA-1, SHA-256), and generate a MAC output ($MAC_{STS1}$ 320). According to another example, the STS MAC generator 316 is operative to generate a MAC of a response message ($M_R$) using a key derived from the binding key 118 ($k_{mac2}$ 324) and a nonce value (nonce$_{mac2}$ 322) generated by the STS nonce generator 312 as inputs to a symmetric key MAC function (MAC) (e.g., AES-CMAC, MD5, SHA-1, SHA-256), and generate a MAC digest output ($MAC_{STS2A}$ 510, $MAC_{STS2B}$ 518, or $MAC_{STS2C}$ 526).

The STS encryptor/decryptor 318 is illustrative of a software module, system, or device operative to encrypt or decrypt messages using a key, such as the binding key 118, a key derived from the binding key 118, or the STS private key. According to an example, the STS encryptor/decryptor 318 is operative to encrypt a response message ($M_R$) intended for the client 112 using a symmetric key cipher with the STS-derived encryption key ($k_{enc}$ 310). An example ciphering operation of a response message ($M_R$) is described below with respect to FIGS. 5A, 5B, and 5C.

As described, request messages are signed by a key derived from the binding key 118, and responses are encrypted with a key derived from the binding key 118. According to an aspect, a nonce is included in the request to prevent replay attacks. For example, an attacker could steal the request, including the signature, and replay it at a later time from a different location, thus defeating binding the TGT to the client 112.

According to examples, a nonce for the request can be generated on the client 112 (e.g., using a client timestamp), or can be obtained from the STS 110. While obtaining a nonce from the STS 110 is secure, it is relatively expensive, as it entails an additional network call. Generating the nonce on the client 112 is fast and is less expensive. An attacker may be able to pre-generate requests with nonces that can be used at any time in the future. Accordingly, the responses are encrypted such that if an attacker does pre-generate requests, the responses are encrypted with a key derived from the binding key 118, which prevents the attacker from accessing the security token.

Figure 4:
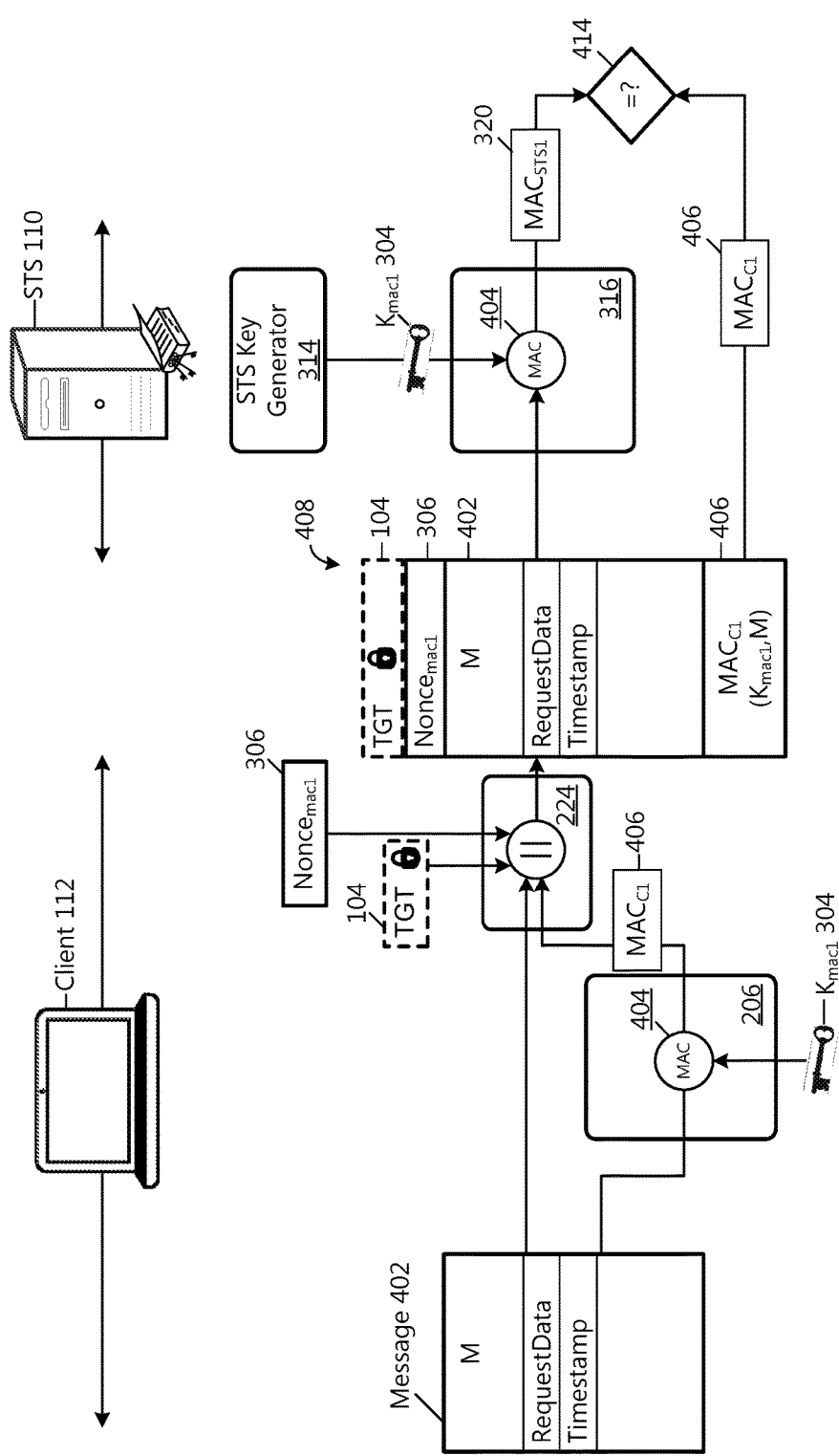
FIG. 4 is a block diagram illustrating an example signing of a request message by a key derived from a binding key.

With reference now to FIG. 4, a diagram illustrating example authenticating operations associated with a request message (M) 402 is shown. As illustrated, the client 112 generates a request message (M) 402 intended for the STS 110. For example, the request message (M) 402 may be an authentication request 103, where the client 112 sends the client user's credentials 102 to the STS 110, and instructs the STS 110 to return a TGT 104. As another example, when the client 112 has already obtained a TGT 104, the request message (M) 402 may be a service token request 106, wherein the client 112 includes the TGT 104, and instructs the STS 110 to return a service token 107. In some examples, the request message (M) includes request data and a timestamp. For example, the request data may include information identifying which security token (e.g., TGT 104 or a particular service token 107) to obtain.

The MAC generator 206 is operative to generate a MAC by taking the request message (M) 402 as an input, applying the first key derived from the binding key ($k_{mac1}$ 304) to the request message (M) 402, and applying a symmetric key algorithm 404 for generating a MAC of the composite message. According to an aspect, it is computationally infeasible to recreate or reverse engineer the original request message (M) 402 data from the resulting MAC ($MAC_{C1}$ 406).

The concatenator 224 is operative to concatenate together the request message (M) 402, the resulting MAC output ($MAC_{C1}$ 406), and the nonce$_{mac1}$ 306 used to derive $k_{mac1}$ 304 to form a composite message 408. When the request message (M) 402 is a service token request 106, the concatenator 224 is operative to include the TGT 104 in the concatenation forming the composite message 408. For example:

Request=TGT,nonce$_{mac1}$,$M$,$MAC_{c1}$($k_{mac1}$,$M$)

Where: M=(RequestData, TimeStamp).

The client 112 transmits the composite message 408 to the STS 110. As described above, the STS key generator 314 derives $k_{mac1}$ 304 using the client-provided PRF 205, the client-provided nonce$_{mac1}$ 306, and the shared secret binding key 118 as inputs. The STS MAC generator 316 is operative to generate a MAC of the request message (M) 402 in the received composite message 408 using $k_{mac1}$ 304 and nonce$_{mac1}$ 306 provided by the client 112, and generate a MAC output ($MAC_{STS1}$ 320).

According to an aspect, the STS 110 comprises an STS message authenticator 414, illustrative of a software module, system, or device operative to verify the integrity of a received input message by comparing the received MAC generated by the client 112 ($MAC_{C1}$ 406) to the server-side calculated MAC value ($MAC_{STS1}$ 320). Since a MAC depends on all the bits in the input request message (M) 402, any alteration (e.g., forgeries, unauthorized alterations) of the input request message (M) 402 during transmission would cause the server-side calculated MAC value ($MAC_{STS1}$ 320) to not match with its original MAC value ($MAC_{C1}$ 406). If $MAC_{C1}$=$MAC_{STS1}$, the STS message authenticator 414 is operative to authenticate the composite message 408 as coming from the alleged sender (client 112).

Figure 5A:
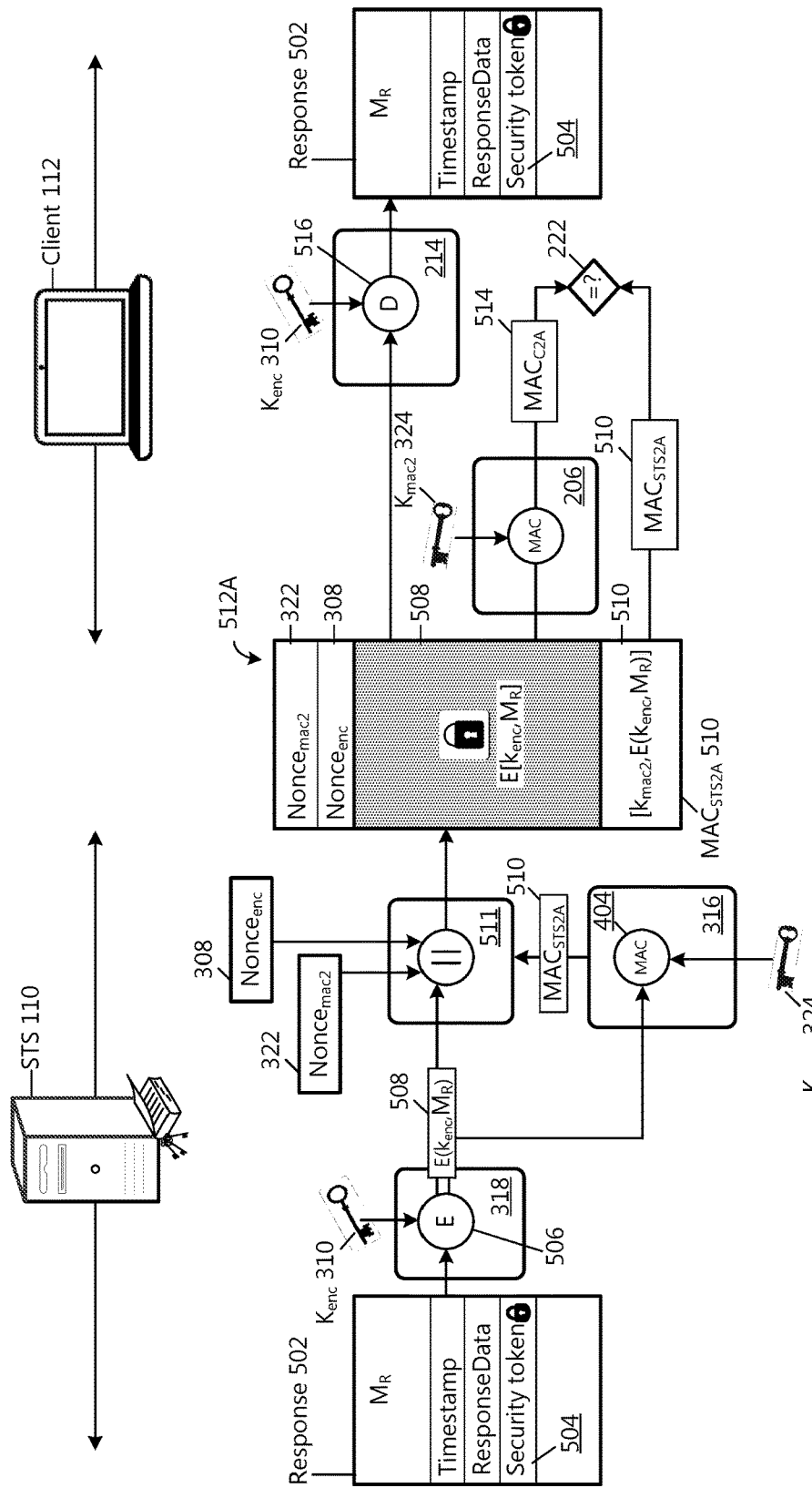
FIG. 5A is a block diagram illustrating example authenticating and ciphering operations associated with a response message using an encrypt-then-MAC approach.
Figure 5B:
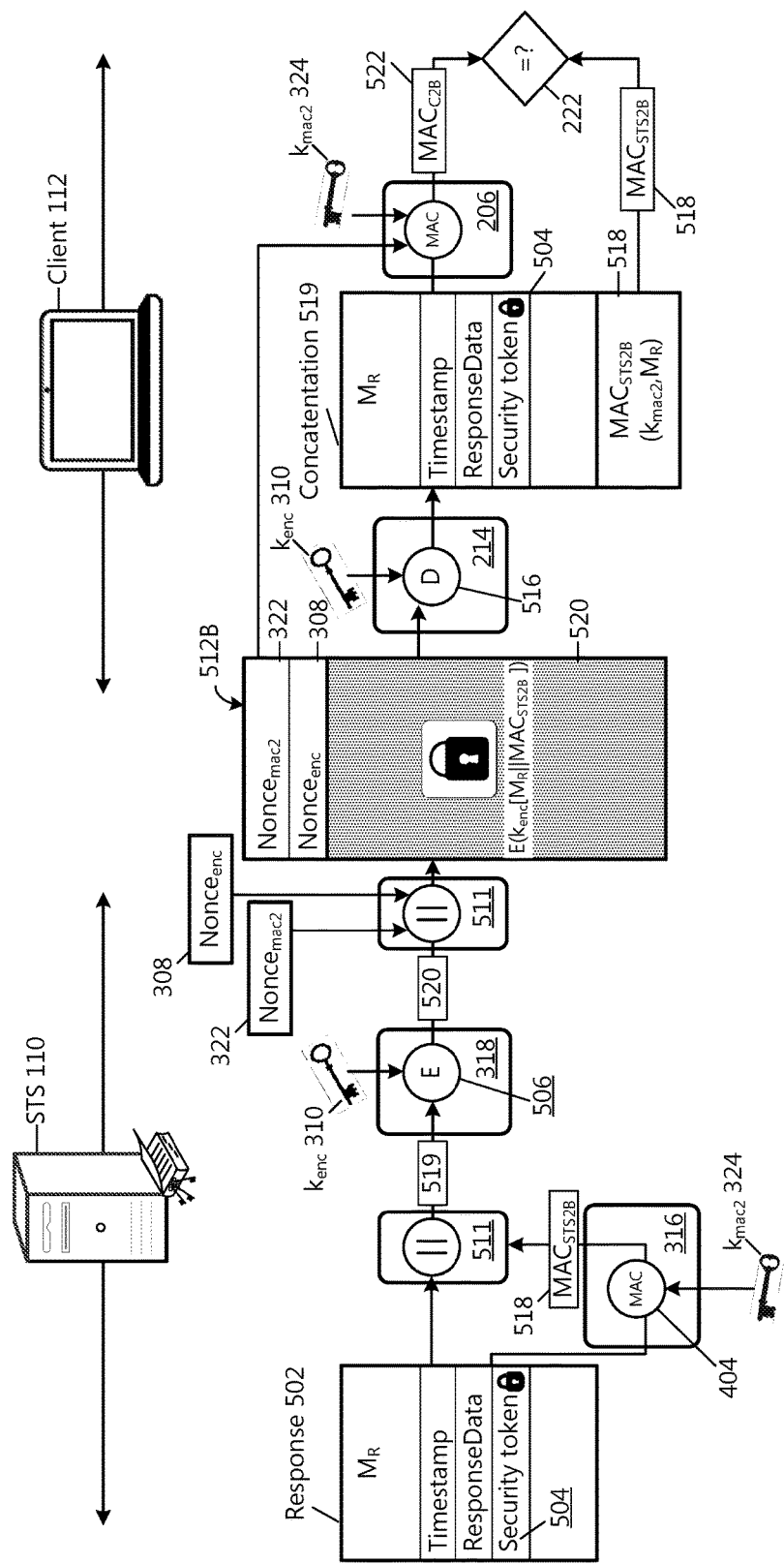
FIG. 5B is a block diagram illustrating example authenticating generating and ciphering operations associated with a response message using a MAC-then-encrypt approach.
Figure 5C:
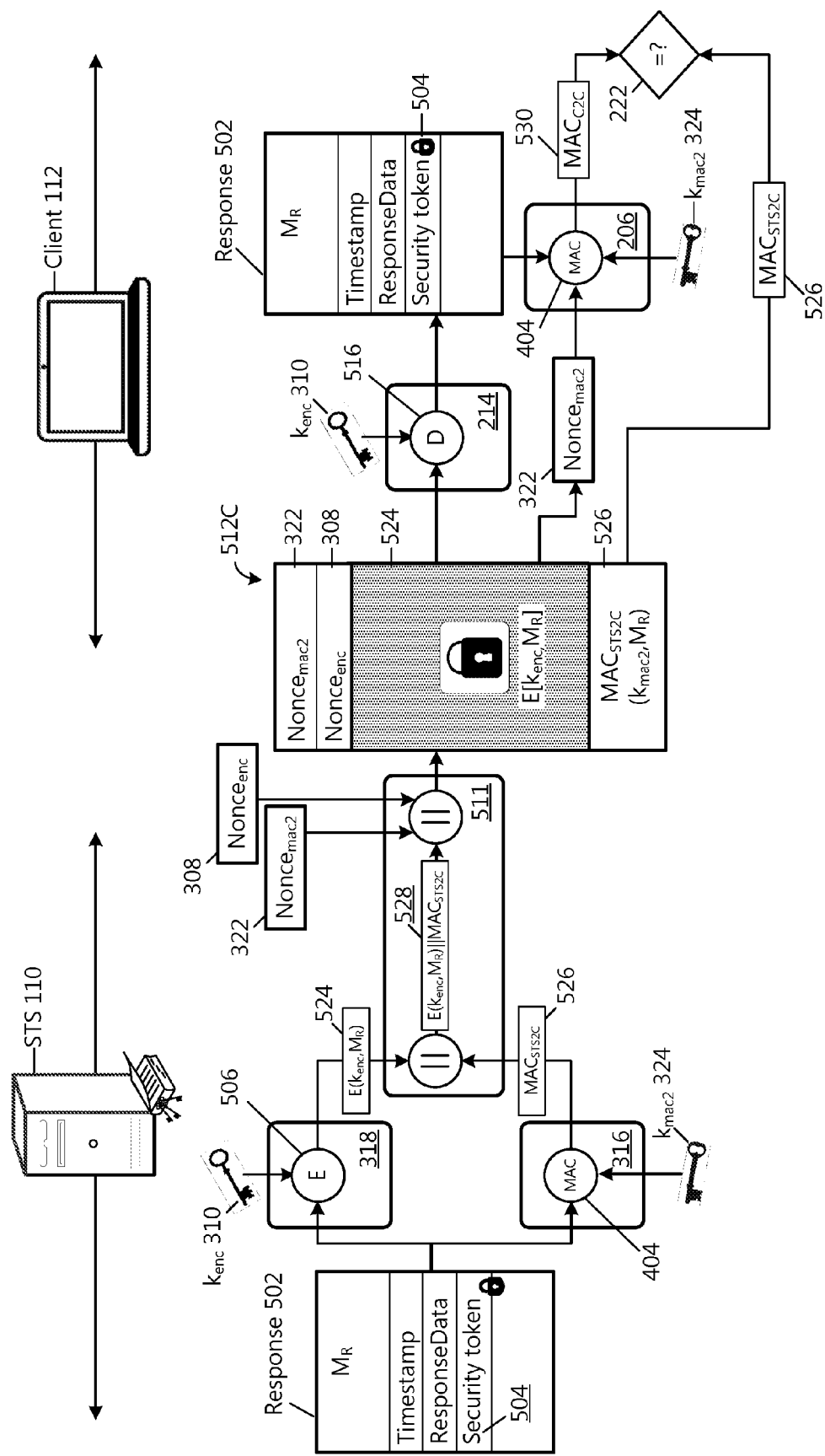
FIG. 5C is a block diagram illustrating example authenticating generating and ciphering operations associated with a response message using an encrypt-and-MAC approach.

FIGS. 5A, 5B, and 5C are block diagrams illustrating example authenticating and ciphering operations associated with a response message ($M_R$) 502. The STS 110 generates a response message ($M_R$) 502 intended for the client 112. For example, the response message ($M_R$) 502 may be a response to an authentication request 103 or a response to a service token request 106. In some examples, the response message ($M_R$) 502 includes a time stamp, response data, and a requested security token 504 (e.g., a TGT 104 or a service token 107). According to an aspect, the security token 504 is encrypted. For example, if the security token 504 is a TGT 104, the TGT 104 is encrypted with a key owned by the STS, such that only the STS 110 is able to decrypt the TGT 104. As another example, if the security token 504 is a service token 107, the service token 107 is encrypted with a key owned by the RP, such that only the RP 122 is able to decrypt the service token 107.

According to an example and as illustrated in FIG. 5A, the STS encrypts the response message ($M_R$) 502, and then generates a MAC of the encrypted data. For example and as illustrated, the STS encryptor/decryptor 318 encrypts the response message ($M_R$) 502 using a symmetric key cipher (E) 506 (i.e., encryption function) with the derived encryption key ($k_{enc}$ 310), and generates ciphertext (E($k_{enc}$,$M_R$)) 508. According to an example, the STS encryptor/decryptor 318 uses an AES 128 cipher operating in Cipher Block Chaining (CBC) mode as the symmetric key cipher 506 to encrypt the response message ($M_R$) 502.

The STS MAC generator 316 generates a MAC of the encrypted data by taking the ciphertext (E($k_{enc}$,$M_R$)) 508 as an input, applying a key derived from the binding key 118 ($k_{mac2}$ 324) to the ciphertext (E($k_{enc}$,$M_R$)) 508, and applying a MAC function (MAC) 404 for generating a MAC of the encrypted response message 502 (i.e., ciphertext 508). For example, $MAC_{STS2}$=MAC($k_{mac2}$,E($k_{enc}$,$M_R$)). According to an aspect, it is computationally infeasible to recreate or reverse engineer the original response message ($M_R$) 502 data from the resulting MAC output ($MAC_{STS2A}$ 510).

An STS concatenator 511, illustrative of a software module, system, or device, is operative to concatenate together the ciphertext ($E(k_{enc}, M_R)$) 508, the MAC ($MAC_{STS2A}$) 510, the nonce$_{enc}$ 308 used to encrypt the response message ($M_R$) 508, and the nonce$_{mac2}$ 322 used to derive $k_{mac2}$ 324 to form a composite response message 512A. For example:

$$\text{Response} = \text{nonce}_{mac2}, \text{nonce}_{enc}, E(k_{enc}, M_R), MAC_{STS2}(k_{mac2}, E(k_{enc}, M_R))$$

where: $M_R$=TimeStamp, ResponseData.

The STS 110 transmits the composite response message 512A to the client 112. According to an aspect, the client 112 authenticates the response message 512A. For example, the client key generator 204 derives $k_{mac2}$ 324 using the PRF 205, the STS-provided nonce$_{mac2}$ 322, and the shared secret binding key 118 as inputs. The client MAC generator 206 is operative to take in the encrypted response message ($M_R$) 502 in the received composite response message 512A, apply a MAC function using $k_{mac2}$ 324 and nonce$_{mac2}$ 322 provided by the STS 110, and generate a MAC output ($MAC_{C2A}$ 514).

According to an aspect, the client message authenticator 222 verifies the integrity of the received composite response message 512A by comparing the received MAC generated by the STS 110 ($MAC_{STS2A}$ 510) to the client-side calculated MAC ($MAC_{C2A}$ 514). If $MAC_{STS2A}$=$MAC_{C2A}$, the client message authenticator 222 is operative to authenticate the message as coming from the alleged sender (STS 110).

According to an aspect, the client encryptor/decryptor 214 decrypts the received ciphertext ($E[k_{enc}, M_R]$) 508 using a decipher function (D) 516 with the derived encryption key ($k_{enc}$ 310), and converts the ciphertext ($E(k_{enc}, M_R)$) 508 to the plaintext response message ($M_R$) 502. According to an example, the encryptor/decryptor 214 uses an AES 128 cipher in CBC mode as the decipher function (D) 516 to decrypt the ciphertext ($E(k_{enc}, M_R)$) 508. As described above, the response message ($M_R$) 502 includes a security token 504 (e.g., TGT 104, service token 107).

According to another example and as illustrated in FIG. 5B, the STS 110 generates a MAC of the response message ($M_R$) 502, and then encrypts the MAC and message. For example and as illustrated, the STS MAC generator 316 generates a MAC of the response message ($M_R$) 502 by taking the response message ($M_R$) 502 as an input, applying the key derived from the binding key ($k_{mac2}$ 324) to the response message ($M_R$) 502, and applying a MAC function (MAC) 404 for generating a MAC of the response message ($M_R$) 502. According to an aspect, the STS concatenator 511 concatenates the resulting $MAC_{STS2B}$ 518 ($MAC(k_{enc}, M_R)$) with the response message ($M_R$) 502, and outputs a concatenation ($M_R$||$MAC(k_{mac2}, M_R)$) 519 to the STS encryptor/decryptor 318.

The STS encryptor/decryptor 318 encrypts the concatenation ($M_R$||$MAC(k_{mac2}, M_R)$) 519 using a symmetric key cipher (E) 506 (i.e., encryption function) with the derived encryption key ($k_{enc}$ 310), and generates ciphertext ($E(k_{enc}[M_R||MAC(k_{mac2}, M_R)])$) 520. According to an example, the STS encryptor/decryptor 318 uses an AES 128 cipher in CBC mode as the symmetric key cipher 506 to encrypt the concatenation 519. According to an aspect, the ciphertext ($E(k_{enc}[M_R||MAC(k_{mac2}, M_R)])$) 520, the nonce$_{mac2}$ 322 used to derive $k_{mac2}$ 324 to generate the MAC, and the nonce$_{enc}$ 308 used to encrypt the concatenation ($M_R$||$MAC(k_{mac2}$, $M_R$)) 519 are concatenated together to form a composite response message 512B. For example:

$$\text{Response} = \text{nonce}_{mac2}, \text{nonce}_{enc}, E(k_{enc}[M_R||MAC(k_{mac2}, M_R)])$$

where: $M_R$=TimeStamp, ResponseData.

The STS 110 transmits the composite response message 512B to the client 112. According to an aspect, the client 112 decrypts a portion of the composite response message 512B. The client key generator 204 derives $k_{mac2}$ 324 using the PRF 205, the STS-provided nonce$_{mac2}$ 322, and the shared secret binding key 118 as inputs. The client-side encryptor/decryptor 214 is operative to use $k_{mac2}$ 324 to decrypt the received ciphertext ($E(k_{enc}[M_R||MAC(k_{mac2}, M_R)])$) 520 using a decipher function (D) 516 with the derived encryption key ($k_{enc}$ 310), and converts the ciphertext ($E(k_{enc}[M_R||MAC(k_{mac2}, M_R)])$) 520 to the plaintext concatenation ($M_R$||$MAC(k_{mac2}, M_R)$) 519. According to an example, the encryptor/decryptor 214 uses an AES 128 cipher in CBC mode as the decipher function (D) 516 to decrypt the ciphertext ($E(k_{enc}[M_R||MAC(k_{mac2}, M_R)])$) 520. As described above, the response message ($M_R$) 502 includes a security token 504 (e.g., TGT 104, service token 107).

According to an aspect, the client 112 authenticates the response message 502. For example, the client key generator 204 derives $k_{mac2}$ 324 using the PRF 205, the STS-provided nonce$_{mac2}$ 322, and the shared secret binding key 118 as inputs. The client MAC generator 206 is operative to take in the decrypted response message ($M_R$) 502, apply a MAC function (MAC) using $k_{mac2}$ 324 and nonce$_{mac2}$ 322 provided by the STS 110, and generate a MAC output ($MAC_{C2B}$ 522).

According to an aspect, the client message authenticator 222 verifies the integrity of the received response message 502 by comparing the received MAC generated by the STS 110 ($MAC_{STS2B}$ 518) to the client-side calculated MAC ($MAC_{C2B}$ 522). If $MAC_{STS2B}$=$MAC_{C2B}$, the client message authenticator 222 is operative to authenticate the message as coming from the alleged sender (STS 110).

According to another example and as illustrated in FIG. 5C, the STS encrypts and MACs the response message 502. For example and as illustrated, the STS encryptor/decryptor 318 encrypts the response message ($M_R$) 502 using a symmetric key cipher (E) 506 (i.e., encryption function) with the derived encryption key ($k_{enc}$ 310), and generates ciphertext ($E(k_{enc}, M_R)$) 524. According to an example, the STS encryptor/decryptor 318 uses an AES 128 with CBC cipher as the symmetric key cipher 506 to encrypt the response message ($M_R$) 502.

Additionally, the STS MAC generator 316 generates a MAC of the response message ($M_R$) 502 by taking the response message ($M_R$) 502 as an input, applying the key derived from the binding key ($k_{mac2}$ 324) to the response message ($M_R$) 502, and applying a MAC function (MAC) 404 for generating a MAC of the response message ($M_R$) 502 (i.e., $MAC_{STS2C}$ 526). According to an aspect, the resulting $MAC_{STS2C}$ 526 ($MAC(k_{mac2}, M_R)$) and the encrypted response message ($M_R$) 502 (i.e., ciphertext 524) are concatenated together to form concatenation ($E(k_{enc}, M_R)$||$MAC_{STS2C}$) 528. Then, the nonce$_{mac2}$ 322, used to derive $k_{mac2}$ 324 to generate the MAC of the message response ($M_R$) 502 (i.e., $MAC_{STS2C}$ 526), and the nonce$_{enc}$ 308, used to derive $k_{enc}$ 310 to encrypt the message response ($M_R$) 502, are concatenated together with the concatenation ($E(k_{enc}, M_R)$||$MAC_{STS2C}$) 528 to form a composite response message 512C. For example:

$$\text{Response} = \text{nonce}_{mac2}, \text{nonce}_{enc}, E(k_{enc}, M_R), \text{MAC}$$
$$(k_{mac2}, M_R)$$

where: $M_R$=TimeStamp, ResponseData.

The STS 110 transmits the composite response message 512C to the client 112. According to an aspect, the client 112 decrypts a portion of the response message 512C. The client key generator 204 derives $k_{mac2}$ 324 using the PRF 205, the STS-provided nonce$_{mac2}$ 322, and the shared secret binding key 118 as inputs. The client-side encryptor/decryptor 214 is operative to use $k_{mac2}$ 324 to decrypt the received ciphertext $(E(k_{enc}, M_R))$ 524 using a decipher function (D) 516 with the derived encryption key ($k_{enc}$ 310), and converts the ciphertext $(E(k_{enc}, M_R))$ 524 to the plaintext response message $(M_R)$ 502. According to an example, the encryptor/decryptor 214 uses an AES 128 cipher in CBC mode as the decipher function (D) 516 to decrypt the ciphertext $(E(k_{enc}, M_R))$ 524. As described above, the response message $(M_R)$ 502 includes a security token 504 (e.g., TGT 104, service token 107).

According to an aspect, the client 112 authenticates the response message 502. For example, the client key generator 204 derives $k_{mac2}$ 324 using the PRF 205, the STS-provided nonce$_{mac2}$ 322, and the shared secret binding key 118 as inputs. The client MAC generator 206 is operative to use $k_{mac2}$ 324 to take in the decrypted response message $(M_R)$ 502, apply a MAC function using $k_{mac2}$ 324 and nonce$_{mac2}$ 322 provided by the STS 110, and generate a MAC (MAC$_{C2C}$ 530).

According to an aspect, the client message authenticator 222 verifies the integrity of the received response message 502 by comparing the received MAC generated by the STS 110 (MAC$_{STS2C}$ 526) to the client-side calculated MAC (MAC$_{C2C}$ 530). If MAC$_{STS2C}$=MAC$_{C2C}$, the client message authenticator 222 is operative to authenticate the message as coming from the alleged sender (STS 110).

According to an aspect, by encrypting the response message $(M_R)$ 502 with a key derived from the binding key 118 ($k_{enc}$ 310), only a key binder 114 in possession of the binding key 118 is enabled to acquire the security token 504. Accordingly, the security token 504 is bound to the key binder 114 securing the binding key 118, and only the client 112 operationally attached to the key binder 114 is enabled to use the security token 504.

According to an aspect, a security token 504 can be bound to a plurality of token binders 114 associated with a client 112. To bind a security token 504 to a plurality of token binders 114a-n (collectively 114), a plurality of binding keys 118a-n (collectively 118) are established. In some examples, the plurality of binding keys 118a-n are individually generated. For example, a first token binder 114 may be a TPM comprising a first binding key 118 established at manufacturing time of the TPM, during initial authentication with the STS 110, or in a separate step prior to authentication; and a second token binder 114 may be a vTPM or a CLiP comprising a second binding key 118 established during initial authentication with the STS 110 or in a separate step prior to authentication. In other examples, a first binding key 118 bound to a first token binder 114 may be used as a master key to derive a binding key 118 for a second token binder 114.

Figure 6:
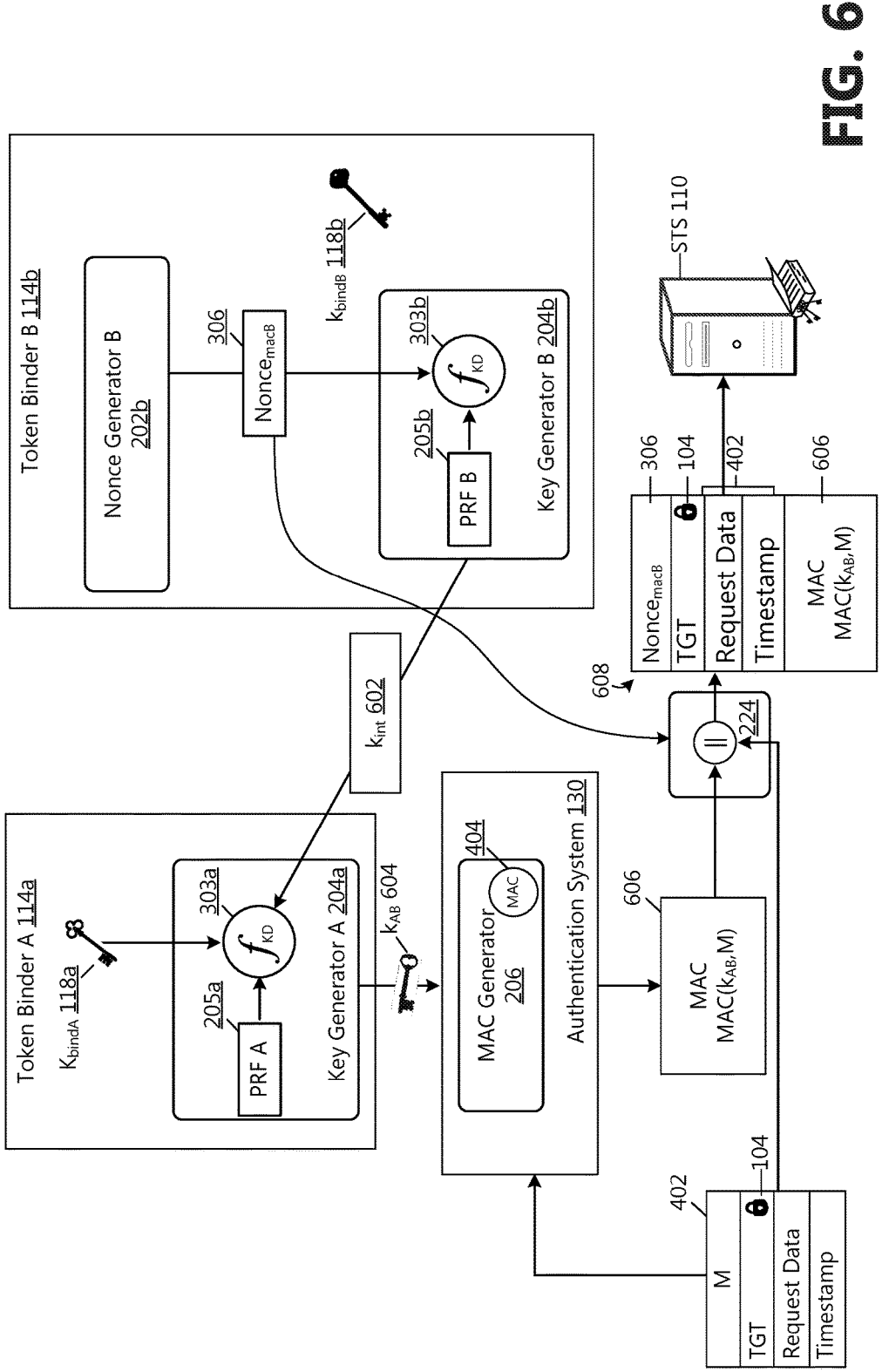
FIG. 6 is a block diagram illustrating an example scheme where two token binders are chained to obtain a cryptographically strong key for signing a request message.

FIG. 6 is a block diagram illustrating an example scheme where two token binders 114 are chained to obtain a cryptographically strong key to sign a request message (M) 402. For example, a key is derived from two binding keys 118a,b, wherein each of the two binding keys 118a,b is bound to a token binder 114a,b associated with a client 112. With reference now to FIG. 6, a key generator (key generator B 204b) associated with a first token binder (token binder B 114b) uses a binding key (binding key B 118b) and a nonce value (nonce$_{macB}$ 306) generated by a first nonce generator (nonce generator B 202b), and a first PRF 205b provided by the first token binder 114b as inputs to a first KDF 303b, and derives an intermediate key ($k_{int}$ 602). According to an aspect, the derived intermediate $k_{int}$ 602 is output to a second token binder (token binder A 114a) for use as keying material input in addition to a second PRF 205a provided by the second token binder 114a and the binding key ($k_{bindA}$ 118a) protected by the second token binder 114a for a KDF 303a constructed by a second key generator (key generator A 204a) to derive a chaining key ($k_{AB}$ 604).

According to an aspect, the chaining key ($k_{AB}$ 604) is output to a MAC generator 206 of the authentication client 130, wherein the MAC generator 206 is operative to generate a MAC 606 by taking the request message (M) 402 as an input, applying the chaining key ($k_{AB}$ 604) to the request message (M) 402, and applying a symmetric key algorithm 404.

According to examples, the client concatenator 224 concatenates the request message (M) 402 with the MAC (MAC($k_{AB}$,M)) 606 and the nonce value (nonce$_{macB}$ 306) used to derive the intermediate key ($k_{int}$ 602), and the client 112 sends the concatenated request 608 to the STS 110. In some examples, the message (M) 402 is an authentication request message 103, where the client 112 sends the client user's credentials 102 to the STS 110, and instructs the STS 110 to return a TGT 104. As another example, when the client 112 has already obtained a TGT 104, the request message (M) 402 may be a service token request 106, wherein the client 112 includes the TGT 104, and instructs the STS 110 to return a service token 107. In some examples, the request message (M) 402 includes request data and a timestamp. For example, the request data may include information identifying which security token 504 (e.g., TGT 104 or a particular service token 107) to obtain.

According to an aspect, the client 112 instructs the STS 110 to encrypt the response comprising the TGT 104 or the service token 107 with the chaining key ($k_{AB}$ 604). Since the TGT 104 is bound to the client 112, it can only be used by the client 112 in possession of binding keys 118a,b.

According to examples, binding a security token 504, such as a TGT 104 or a service token 107, to multiple token binders 114 increases security. For example, an attacker must circumvent multiple trust modules rather than a single trust module. Additionally, binding a security token 504 to multiple token binders 114 increases flexibility of the system. For example, based on the client device 112 and operating systems capabilities, different combinations of token binders 114 can be used.

According to some examples, binding a security token 504 to multiple token binders 114 enables the STS 110 and the client 112 to provide different claims to an RP 122, for example, claims associated with a protection level. Accordingly, the claims may be included in a service token 107 for providing to an RP 122. According to an example, when multiple token binders 114 are used to generate a chaining key ($k_{AB}$ 604) and one of the token binders 114 is a CLIP, the CliP is operative to provide a set of claims directed to licensing (e.g., the client 112 is running a licensed copy of an operating system), while the other token binder 114 is operative to provide a set of claims directed to the client's hardware (e.g., security token 107 is bound to token binder 114 associated with the client 112). According to an aspect, the increased security or multiple claims provided by chaining multiple token binders 114 enables an RP 122 to allow more privileged operations to the client 112.

Figure 7A:
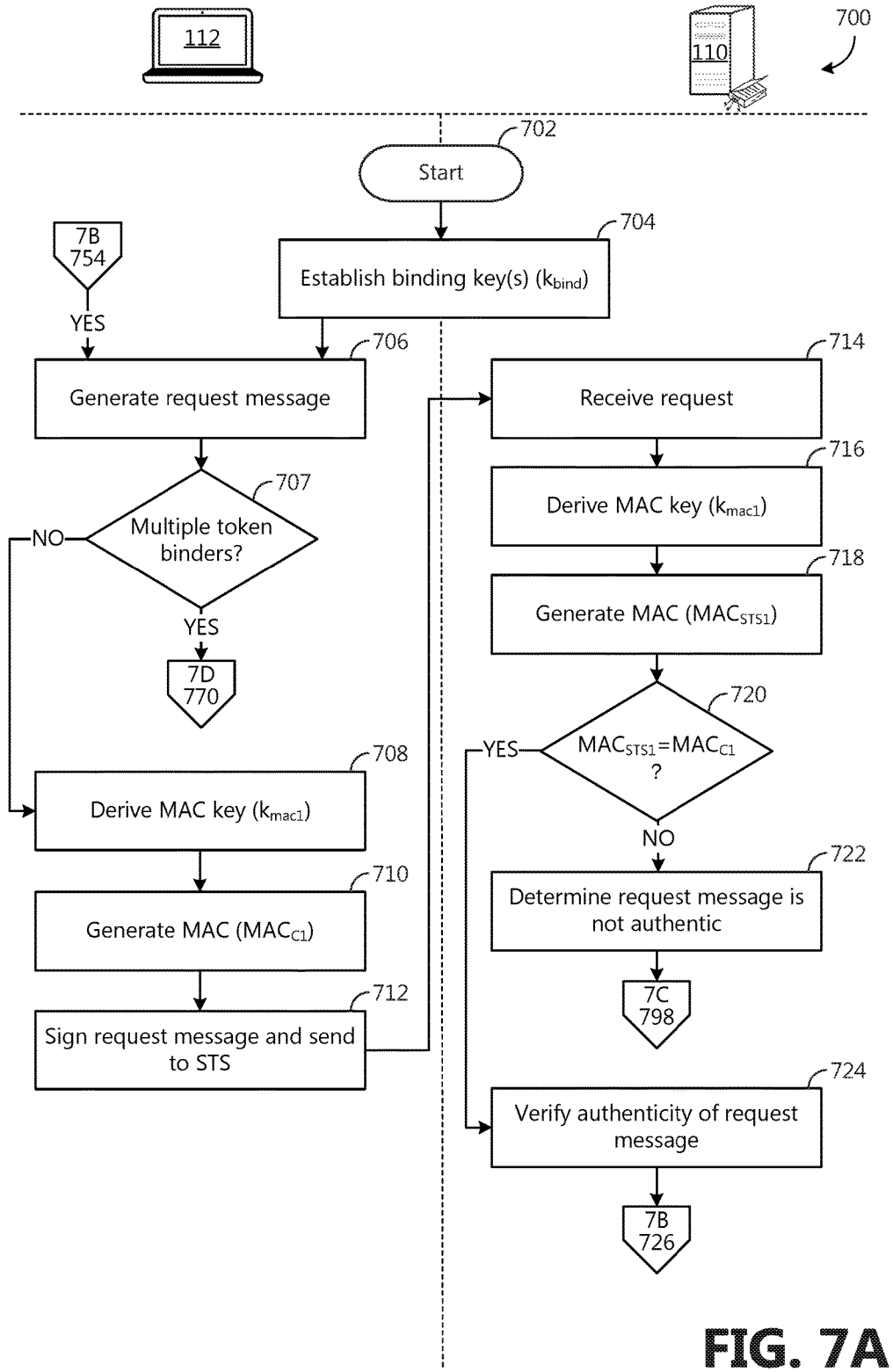
FIGS. 7A-E are flow charts showing general stages involved in an example method for binding a security token to a token binder.
Figure 7B:
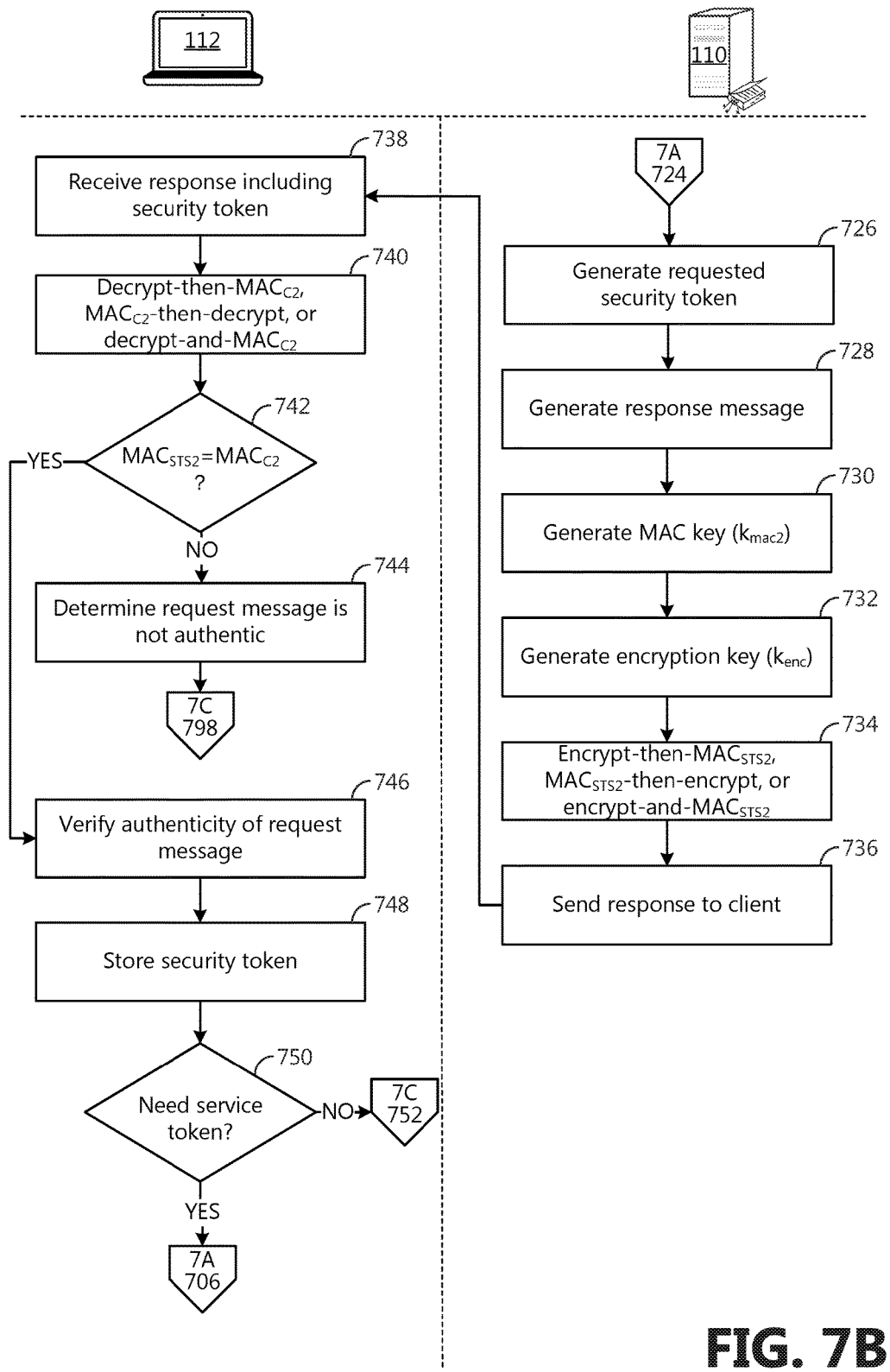

Having described an operating environment, various components of a token binder 114, and various signing, authenticating, and ciphering operation schemes with respect to FIGS. 1-6, FIGS. 7A-7E are flow charts showing general stages involved in an example method 700 for binding a security token to a token binder 114. With reference now to FIG. 7A, the method 700 begins at start OPERATION 702, and proceeds to OPERATION 704, where at least one token binder 114 associated with a client 112 and an STS 110 establish at least one binding key 118. As described above, in some examples, a binding key 118 may be established with a token binder 114 at time of manufacturing and shared with the STS 110 during enrollment of the client 112 with the STS 110. In other examples, a binding key 118 is sent to the client 112 by the STS 110 as part of an initial authentication. In other examples, a binding key 118 is sent to the client 112 by the STS 110 in a separate step prior to authentication. According to an aspect, the at least one binding key 118 is a shared secret between the client 112 and the STS 110.

The method 700 proceeds to OPERATION 706, where the client generates a request message (M) 402. In some examples, the request message (M) 402 is an authentication request message 103, where the client 112 sends the client user's credentials 102 to the STS 110, and instructs the STS 110 to return a TGT 104. As another example, when the client 112 has already obtained a TGT 104, the request message (M) 402 may be a service token request 106, wherein the client 112 includes the TGT 104, and instructs the STS 110 to return a service token 107. In some examples, the request message (M) 402 includes request data and a timestamp. For example, the request data may include information identifying which security token 504 (e.g., TGT 104 or a particular service token 107) to obtain.

The method 700 proceeds to a DECISION OPERATION 707, where a determination is made as to whether the more than one token binder 114 will be combined to sign the request message (M) 402 and thus bind a requested security token 504 to multiple token binders 114. In some examples, the determination is made based on whether the client 112 comprises more than one token binder 114. In other examples, the determination is made based on a level of security desired for a particular security token 504. In other examples, the determination is made based on a set or sets of claims to provide an RP 122.

If a determination is made to use one token binder 114, the method 700 proceeds to OPERATION 708, where the token binder 114 derives a first key ($key_{mac1}$ 304) from the binding key 118. According to an example, the client nonce generator 202 outputs a nonce ($nonce_{mac1}$ 306) to the client key generator 204, and the key generator 204 constructs a KDF 303 defined by a PRF 205 (e.g., HMAC PRF), and uses the binding key 118 and $nonce_{mac1}$ 306 as inputs to the KDF 303 to produce a first derived key ($k_{mac1}$ 304).

The method 700 proceeds to OPERATION 710, where the client MAC generator 206 generates a MAC by taking the request message (M) 402 as an input, applying the first key derived from the binding key ($k_{mac1}$ 304) to the request message (M) 402, and applying a MAC function 404 to generate a MAC of the composite message.

At OPERATION 712, the concatenator 224 concatenates together the request message (M) 402, the resulting MAC ($MAC_{C1}$ 406), and the $nonce_{mac1}$ 306 used to derive $k_{mac1}$ 304, and the client 112 sends the composite message 408 to the STS 110. When the request message (M) 402 is a service token request 106, the TGT 104 is included in the composite message 408.

The method 700 proceeds to OPERATION 714, where the composite message 408 is received by the STS 110. At OPERATION 716, the STS key generator 314 derives $k_{mac1}$ 304 using the client-provided PRF 205, the client-provided $nonce_{mac1}$ 306, and the shared secret binding key 118 as inputs. At OPERATION 718, the STS MAC generator 316 takes in the request message (M) 402 in the received composite message 408, applies a MAC function using $k_{mac1}$ 304 and $nonce_{mac1}$ 306 provided by the client 112, and generates a MAC ($MAC_{STS1}$ 320).

The method 700 proceeds to a DECISION OPERATION 720, where the STS message authenticator 414 verifies the integrity of the received message by comparing the received MAC generated by the client 112 ($MAC_{C1}$ 406) to the server-side calculated MAC ($MAC_{STS1}$ 320). If $MAC_{STS1}$ 320 does not match its original MAC ($MAC_{C1}$ 406), the method 700 proceeds to OPERATION 722, where a determination is made that the message is not authentic, and the method 700 ends at OPERATION 798. For example, a determination is made that the request message (M) 402 may be a forgery or has been altered during transmission.

If at DECISION OPERATION 720 $MAC_{STS1}$ 320 matches $MAC_{C1}$ 406, the method 700 proceeds to OPERATION 724, where the STS message authenticator 414 authenticates the composite message 408 as coming from the alleged sender (client 112). The method 700 proceeds to OPERATION 726 in FIG. 7B, where the STS 110 generates the requested security token 504 (e.g., TGT 104, service token 107).

At OPERATION 728, the STS 110 generates a response message ($M_R$) 502 intended for the client 112. For example, the response message ($M_R$) 502 may be a response to an authentication request 103 or a response to a service token request 106. In some examples, the response message ($M_R$) 502 includes a time stamp, response data, and a requested security token 504. According to an aspect, the STS encryptor/decryptor 318 encrypts the security token 504. For example, if the security token 504 is a TGT 104, the STS encryptor/decryptor 318 encrypts the TGT 104 with the STS's private key, such that only the STS 110 is able to decrypt the TGT 104. As another example, if the security token 504 is a service token 107, the STS encryptor/decryptor 318 encrypts the service token 107 with a key owned by the RP 122, such that only the RP 122 is able to decrypt the service token 107.

The method 700 proceeds to OPERATION 730, where the STS key generator 314 derives a MAC key ($k_{mac2}$ 324). For example, the STS nonce generator 312 generates a nonce value ($nonce_{mac2}$ 322), which the STS key generator 314 uses as an input value in a KDF 304 in addition to the binding key 118, and to which a PRF 205 is applied to produce $k_{mac2}$ 324, which can be used as a cryptographic key in subsequent authenticating operations.

At OPERATION 732, the STS key generator 314 derives a key ($k_{enc}$ 310). For example, the STS nonce generator 312 generates a nonce value ($nonce_{enc}$ 308), which the STS key generator 314 uses as an input value in a KDF 304 in addition to the binding key 118, and to which a PRF 205 is applied to produce $k_{enc}$ 310, which can be used as a cryptographic key in a subsequent decryption operation.

The method 700 proceeds to OPERATION 734, where: the STS encrypts the response message ($M_R$) 502, and then MACs the encrypted data as described above with respect to FIG. 5A (e.g., response=$nonce_{mac2}$, $nonce_{enc}$, $E(k_{enc}, M_R)$, $MAC_{STS2}(k_{enc}, E(k_{enc}, M_R)))$; the STS 110 generates a MAC of the response message ($M_R$) 502, and then encrypts the MAC and message as described above with respect to FIG. 5B (e.g., response=nonce$_{mac2}$, nonce$_{enc}$, $E(k_{enc}[M_R \| MAC(k_{mac2}, M_R)]))$; or the STS 110 encrypts and MACs the response message 502 as described above with respect to FIG. 5C (e.g., response=nonce$_{mac2}$, nonce$_{enc}$, $E(k_{enc}, M_R)$, $MAC(k_{mac2}, M_R))$. At OPERATION 736, the STS 110 sends the response to the client 112.

The method 700 proceeds to OPERATION 738, where the client 112 receives the response, including the requested security token 504. As described above, the response is encrypted with a key derived from the binding key 118, such that only the client 112 in possession of the binding key 118 is enabled to decrypt the response, thus ensuring the security of the security token 504. At OPERATION 740, the client 112 decrypts-then-MACs, MACs-then-decrypts, or decrypts-and-MACs the response according to the method used at OPERATION 734 by the STS 110.

According to an example, if the client 112 decrypts-then-MACs the response, the client key generator 204 derives $k_{mac2}$ 324 using the PRF 205, the STS-provided nonce$_{mac2}$ 322, and the shared secret binding key 118 as inputs. The client MAC generator 206 then takes in the encrypted response message ($M_R$) 502, applies a MAC function using $k_{mac2}$ 324 and nonce$_{mac2}$ 322 provided by the STS 110, and generates a MAC ($MAC_{C2A}$ 514). According to an aspect, the client encryptor/decryptor 214 decrypts the received ciphertext ($E[k_{enc}, M_R]$) 508 using a decipher function (D) 516 with the derived encryption key ($k_{enc}$ 310), and converts the ciphertext ($E(k_{enc}, M_R)$) 508 to the plaintext response message ($M_R$) 502 including the security token 504.

According to another example, if the client 112 MACs-then-decrypts the response, the client key generator 204 derives $k_{mac2}$ 324 using the PRF 205, the STS-provided nonce$_{mac2}$ 322, and the shared secret binding key 118 as inputs. The client-side encryptor/decryptor 214 then uses $k_{mac2}$ 324 to decrypt the received ciphertext ($E(k_{enc}[M_R \| MAC(k_{mac2}, M_R)])$) 520 using a decipher function (D) 516 with the derived encryption key ($k_{enc}$ 310), and converts the ciphertext ($E(k_{enc}[M_R \| MAC(k_{mac2}, M_R)])$) 520 to the plaintext response message ($M_R$) 502 including the security token 504 (e.g., TGT 104, service token 107). According to an aspect, the client 112 authenticates the response message 502. For example, the client key generator 204 derives $k_{mac2}$ 324 using the PRF 205, the STS-provided nonce$_{mac2}$ 322, and the shared secret binding key 118 as inputs. The client MAC generator 206 takes in the decrypted response message ($M_R$) 502, applies a MAC function using $k_{mac2}$ 324 and nonce$_{mac2}$ 322 provided by the STS 110, and generates a MAC ($MAC_{C2B}$ 522).

According to another example, if the client 112 decrypts-and-MACs the response, the client key generator 204 derives $k_{mac2}$ 324 using the PRF 205, the STS-provided nonce$_{mac2}$ 322, and the shared secret binding key 118 as inputs. The client-side encryptor/decryptor 214 then uses $k_{mac2}$ 324 to decrypt the received ciphertext ($E(k_{enc}, M_R)$) 524 using a decipher function (D) 516 with the derived encryption key ($k_{enc}$ 310), and converts the ciphertext ($E(k_{enc}, M_R)$) 524 to the plaintext response message ($M_R$) 502 including the security token 504 (e.g., TGT 104, service token 107). According to an aspect, the client 112 authenticates the response message ($M_R$) 502. For example, the client key generator 204 derives $k_{mac2}$ 324 using the PRF 205, the STS-provided nonce$_{mac2}$ 322, and the shared secret binding key 118 as inputs. The client MAC generator 206 then uses $k_{mac2}$ 324 to take in the decrypted response message ($M_R$) 502, apply a MAC function using $k_{mac2}$ 324 and nonce$_{mac2}$ 322 provided by the STS 110, and generates a MAC ($MAC_{C2C}$ 530).

At DECISION OPERATION 742, the client message authenticator 222 verifies the integrity of the received response message ($M_R$) 502 by comparing the received MAC generated by the STS 110 to the client-side calculated MAC. If the MACs do not match, the method 700 proceeds to OPERATION 744, where the integrity of the response is not verified, and ends at OPERATION 798.

If a determination is made at DECISION OPERATION 742 that the MACs match, the method 700 proceeds to OPERATION 746, where the client message authenticator 222 authenticates the response message ($M_R$) 502 as coming from the alleged sender (STS 110). At OPERATION 748, the client 112 stores the received security token 504.

The method 700 proceeds to DECISION OPERATION 750, where a determination is made as to whether the client 112 needs to request a service token 107. If the client 112 needs a service token 107, for example, if the security token 504 received in the previous response is a TGT 104, and the client 112 still needs a service token 107 to receive a desired service, the method 700 continues to OPERATION 706 in FIG. 7A to request a service token 107. In some examples, the client 112 is able to include a request for a TGT 104 and a service token 107 in a same request, thus reducing network traffic.

Figure 7C:
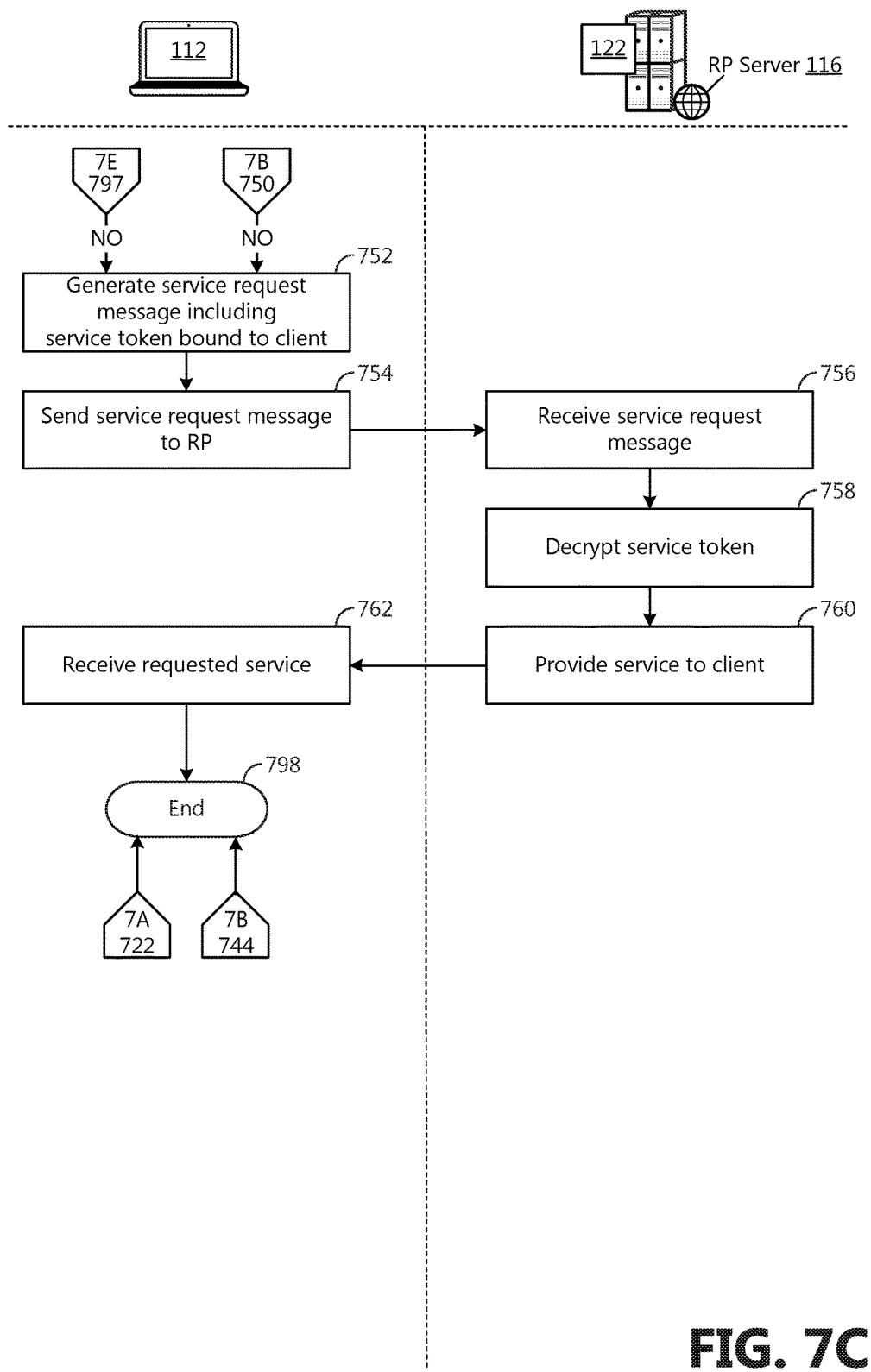

If the client 112 received a desired service token 107 in the previous response, the method 700 continues to OPERATION 752 in FIG. 7C, where the client 112 generates a request message intended for the RP 122 executing on one or more relying party servers 116 and includes the service token 107.

At OPERATION 754, the client 112 sends the service request 109, including the service token 107, to the RP 122. The method 700 proceeds to OPERATION 756, where the RP 122 receives the request message. At OPERATION 758, the RP 122 decrypts the service token 107 with a secret key. At OPERATION 760, the RP 122 provides the service to the client 112, and at OPERATION 762, the client 112 receives the requested service. The method 700 ends at OPERATION 798.

Figure 7D:
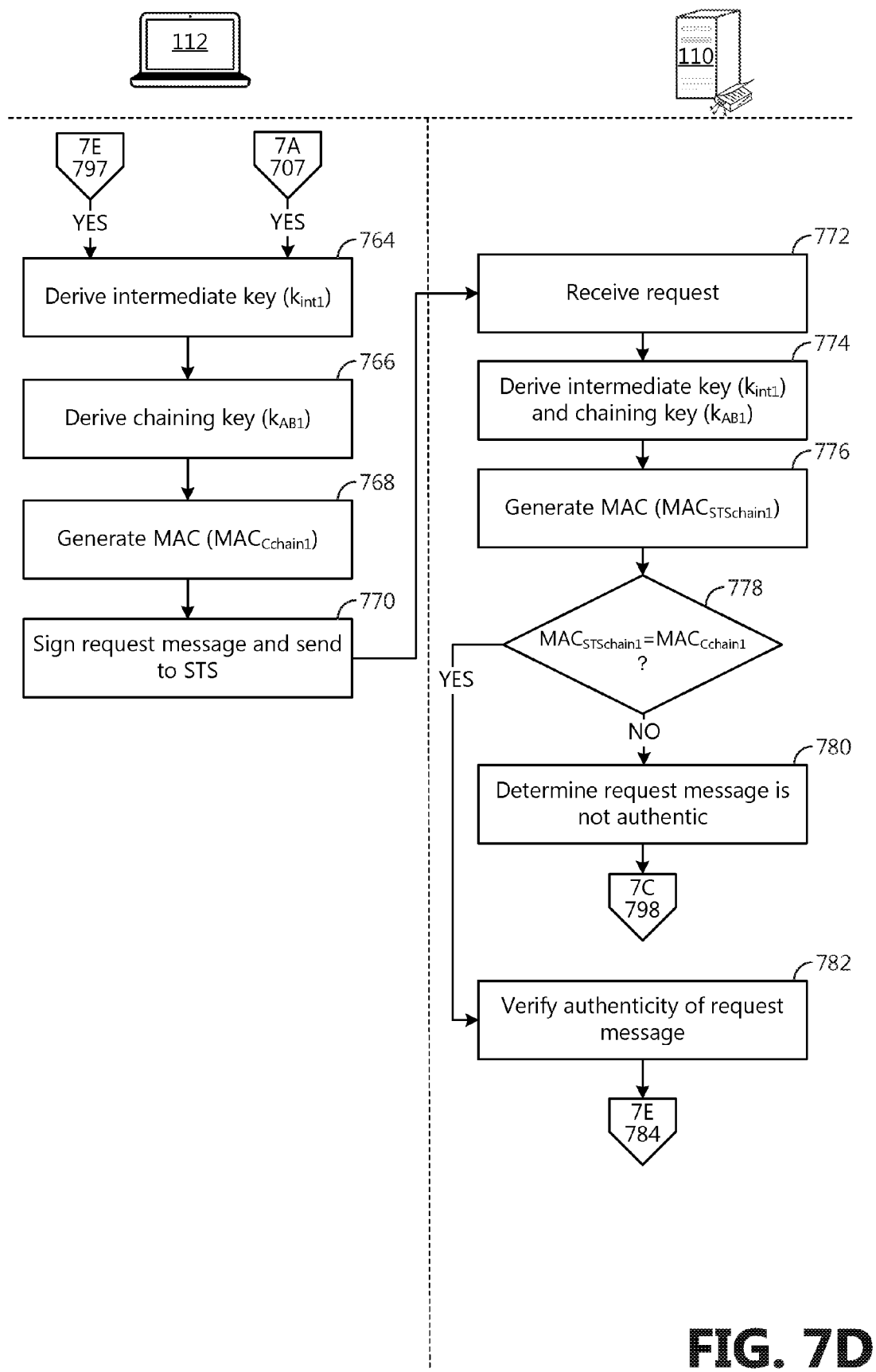
Figure 7E:
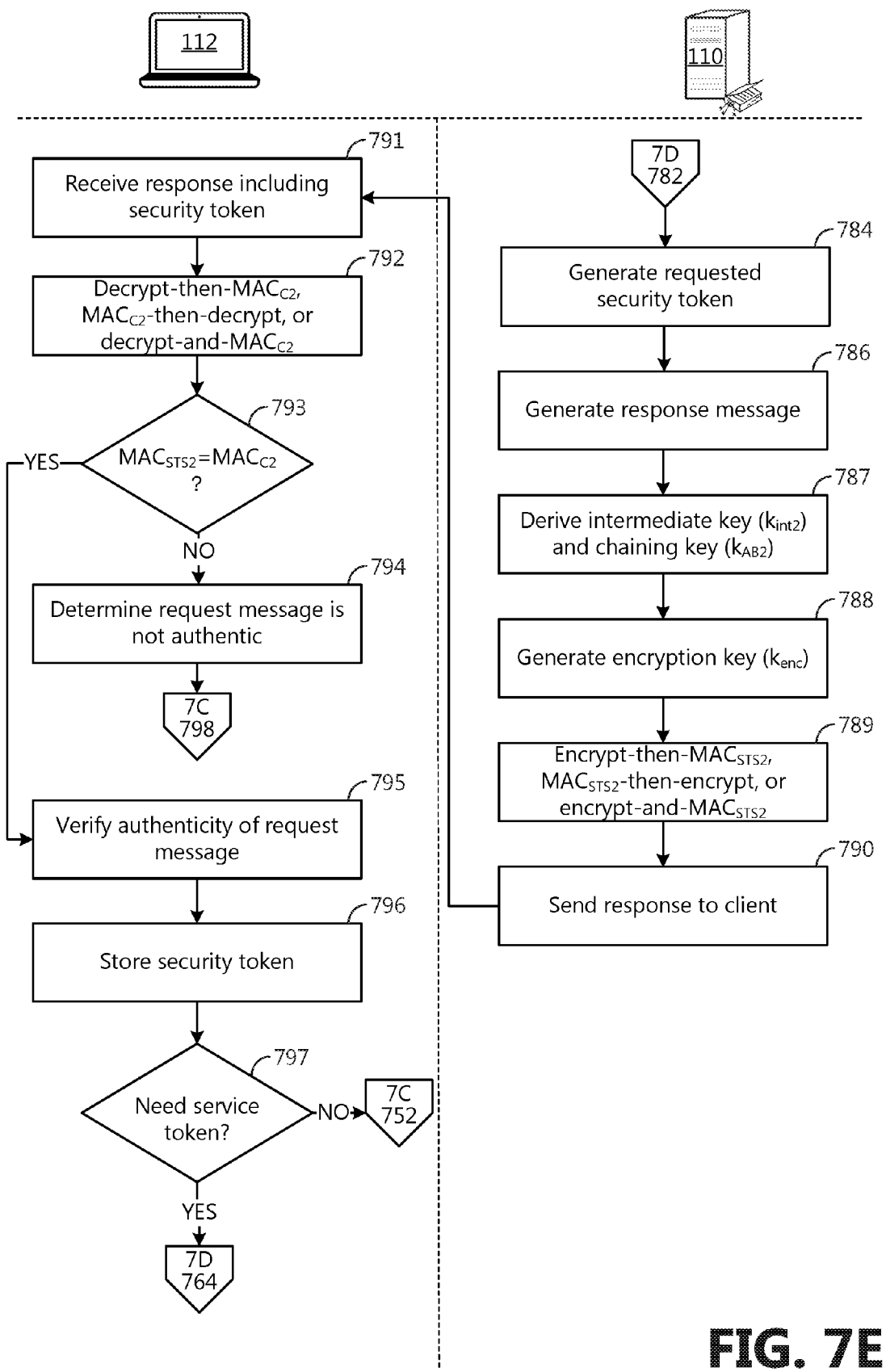

With reference again to FIG. 7A, if a determination is made at DECISION OPERATION 707 that more than one token binder 114 will be combined to sign the request message (M) 402, and thus bind a requested security token 504 to multiple token binders 114, the method 700 proceeds to OPERATION 764 in FIG. 7D, where the key generator (key generator B 204b) associated with the first token binder (token binder B 114b) derives an intermediate key ($k_{int}$ 602) using the binding key (binding key B 118b) associated with the first token binder 114b and a nonce value (nonce$_{macB}$ 306) generated by the nonce generator 202b associated with the first token binder 114b, and a first PRF 205b provided by the first token binder 114b as inputs to the first KDF 303b.

At OPERATION 766, the derived intermediate key ($k_{int}$ 602) is output to the second token binder (token binder A 114a) for use as keying material input in addition to a second PRF 205a provided by the second token binder 114a and the binding key ($k_{bindA}$ 118a) provided by the second token binder 114a for a KDF 303a constructed by the second key generator (key generator A 204a) to derive a chaining key ($k_{AB}$ 604).

The method 700 proceeds to OPERATION 768, where the chaining key ($k_{AB}$ 604) is output to a MAC generator 206, and the MAC generator 206 generates a $MAC_{Cchain1}$ (MAC ($k_{AB}$, M) 606) by taking the request message (M) 402 as an input, appending the chaining key ($k_{AB}$ 604) to the request message (M) 402, and applying a MAC function 404.

At OPERATION 770, the concatenator 224 concatenates the request message (M) 402 with the $MAC_{Cchain1}$ (MAC ($k_{AB}$,M) 606), the nonce value (nonce$_{macB}$ 306) used to derive the intermediate key ($k_{int}$ 602), and a hint indicating the token binders 114 used in generating the signing key ($k_{AB}$ 604), and the client 112 sends the concatenated request 608 to the STS 110. In some examples, the message (M) 402 is an authentication request message 103, where the client 112 sends the client user's 120 credentials 102 to the STS 110, and instructs the STS 110 to return a TGT 104. As another example, when the client 112 has already obtained a TGT 104, the request message (M) 402 is a service token request 106, wherein the client 112 includes the TGT 104, and instructs the STS 110 to return a service token 107. In some examples, the request message (M) 402 includes request data and a timestamp.

The method 700 proceeds to OPERATION 772, where the STS 110 receives the request. At OPERATION 774, the STS key generator 314 uses a client-provided PRF 205, the client-provided nonce value (nonce$_{macB}$ 306), and the shared binding key B ($k_{bindB}$ 118b) to derive the intermediate key ($k_{int}$ 602). The STS key generator 314 uses a client-provided PRF 205, the derived intermediate key ($k_{int}$ 602), and the shared binding key A ($k_{bindA}$ 118a) to derive the chaining key ($k_{AB}$ 604).

The method 700 proceeds to OPERATION 776, where the STS MAC generator 316 uses a symmetric key algorithm 404 to generate a hash digest output ($MAC_{STSchain1}$) of the received request message using $k_{AB}$ 604 and the derived intermediate key ($k_{int}$ 602).

The method 700 proceeds to a DECISION OPERATION 778, where the STS message authenticator 414 verifies the integrity of the received message by comparing the received $MAC_{Cchain1}$ generated by the client 112 (MAC($k_{AB}$,M) 606) to the server-side calculated MAC ($MAC_{STSchain1}$). If the STS-generated MAC does not match its original $MAC_{Cchain1}$ (MAC($k_{AB}$,M) 606), the method 700 proceeds to OPERATION 780, where a determination is made that the message is not authentic, and the method 700 ends at OPERATION 798. For example, a determination is made that the request message (M) 402 may be a forgery or has been altered during transmission.

If a determination is made at DECISION OPERATION 778 that the MACs match, the method 700 proceeds to OPERATION 782, where the STS message authenticator 414 authenticates the received message as coming from the alleged sender (client 112). The method 700 proceeds to OPERATION 784 in FIG. 7E, where the STS 110 generates the requested security token 504 (e.g., TGT 104, service token 107).

At OPERATION 786, the STS 110 generates a response message including an encrypted requested security token 504. The method 700 proceeds to OPERATION 787, where the STS key generator 314 derives an intermediate key ($k_{int2}$) by applying a PRF 205 to an STS-derived nonce value and $k_{bindB}$ 118b. The STS key generator 314 then uses the derived intermediate key ($k_{int2}$) and $k_{bindA}$ 118a to derive a chaining key ($k_{AB2}$). The same protocol is used to derive an encryption key ($k_{enc}$) (OPERATION 788) for encrypting the response message.

The method 700 proceeds to OPERATION 789, where the STS 110 encrypts and MACs the response message using the derived chaining key ($k_{macAB2}$) and the derived encryption key ($k_{enc}$). Accordingly, only a device in possession of both $k_{bindA}$ 118a and $k_{bindB}$ 118b used to derive $k_{macAB2}$ and $k_{enc}$ is enabled to decrypt the response message and obtain the security token 504. As described above, the STS 110 may encrypt-then-MAC, MAC-then-encrypt, or encrypt-and-MAC.

The response message is sent to the client 112 at OPERATION 790. At OPERATION 791, the client 112 receives the response message. The method 700 proceeds to OPERATION 792, where the client 112 derives $k_{macAB2}$ and $k_{enc}$, and MACs and decrypts the response message according to the method used by the STS 110 at OPERATION 789.

The method 700 proceeds to DECISION OPERATION 793, where the client message authenticator 222 verifies the integrity of the received message by comparing the received MAC generated by the STS 110 ($MAC_{STS2}$) to the client-side calculated MAC ($MAC_{C2}$). If the client-generated MAC does not match its original MAC ($MAC_{STS2}$), the method 700 proceeds to OPERATION 794, where a determination is made that the message is not authentic, and the method 700 ends at OPERATION 798. For example, a determination is made that the request message (M) 502 may be a forgery or has been altered during transmission.

If a determination is made at DECISION OPERATION 793 that the MACs match, the method 700 proceeds to OPERATION 795, where the client message authenticator 222 authenticates the response message as coming from the alleged sender (STS 110). At OPERATION 796, the client 112 stores the received security token 504.

The method 700 proceeds to DECISION OPERATION 797, where a determination is made as to whether the client 112 needs to request a service token 107. If the client 112 needs a service token 107, for example, if the security token 504 received in the previous response is a TGT 104, and the client 112 still needs a service token 107 to receive a desired service, the method 700 continues to OPERATION 764 in FIG. 7D to request a service token 107.

If the client 112 received a desired service token 107 in the previous response, the method 700 continues to OPERATION 752 in FIG. 7C, where the client 112 generates a request message intended for the RP 122 and includes the service token 107. According to an aspect, the service token 107 is bound to the token binders 114a,b associated with the client 112.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
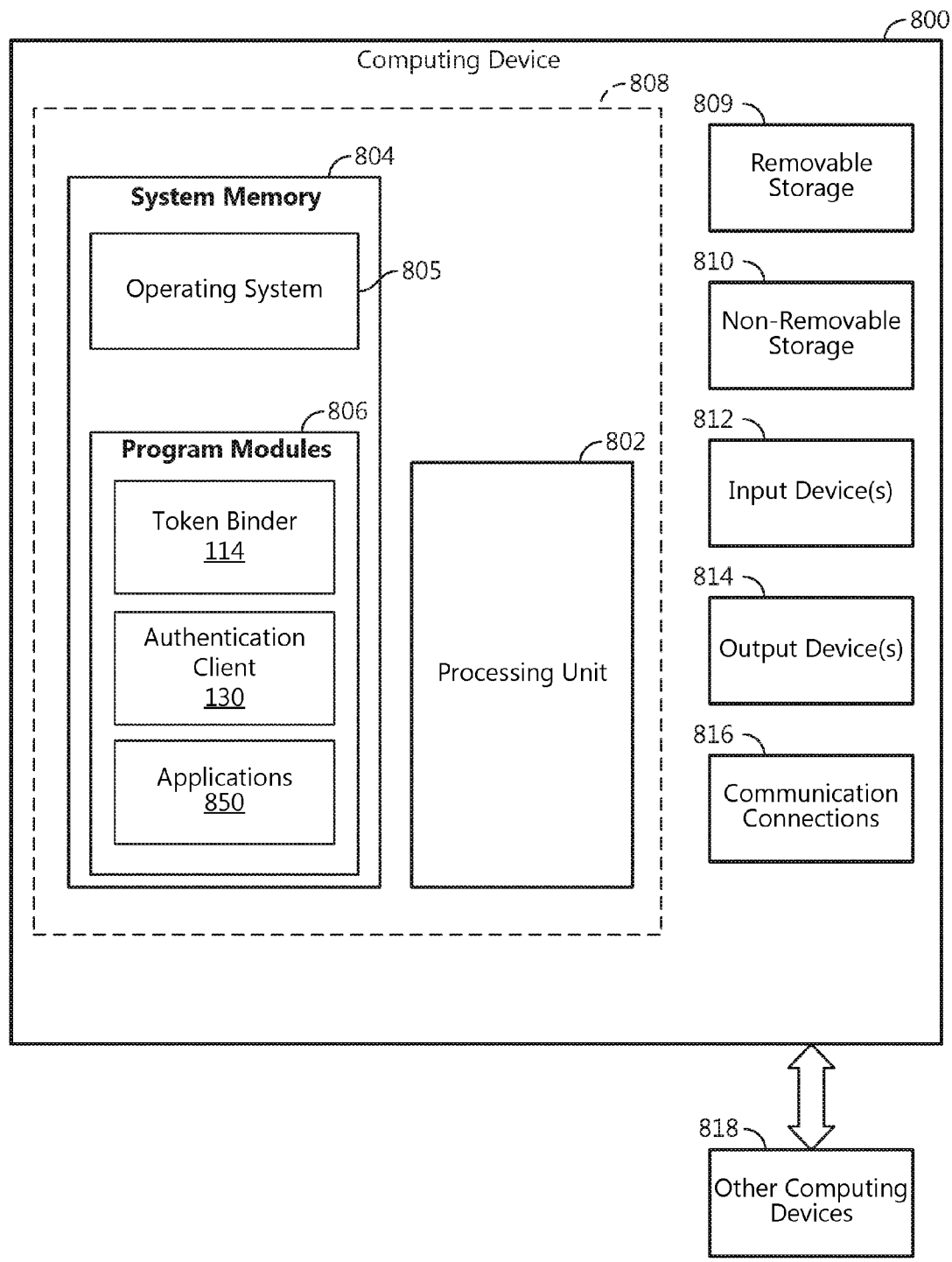
FIG. 8 is a block diagram illustrating example physical components of a computing device.
Figure 9A:
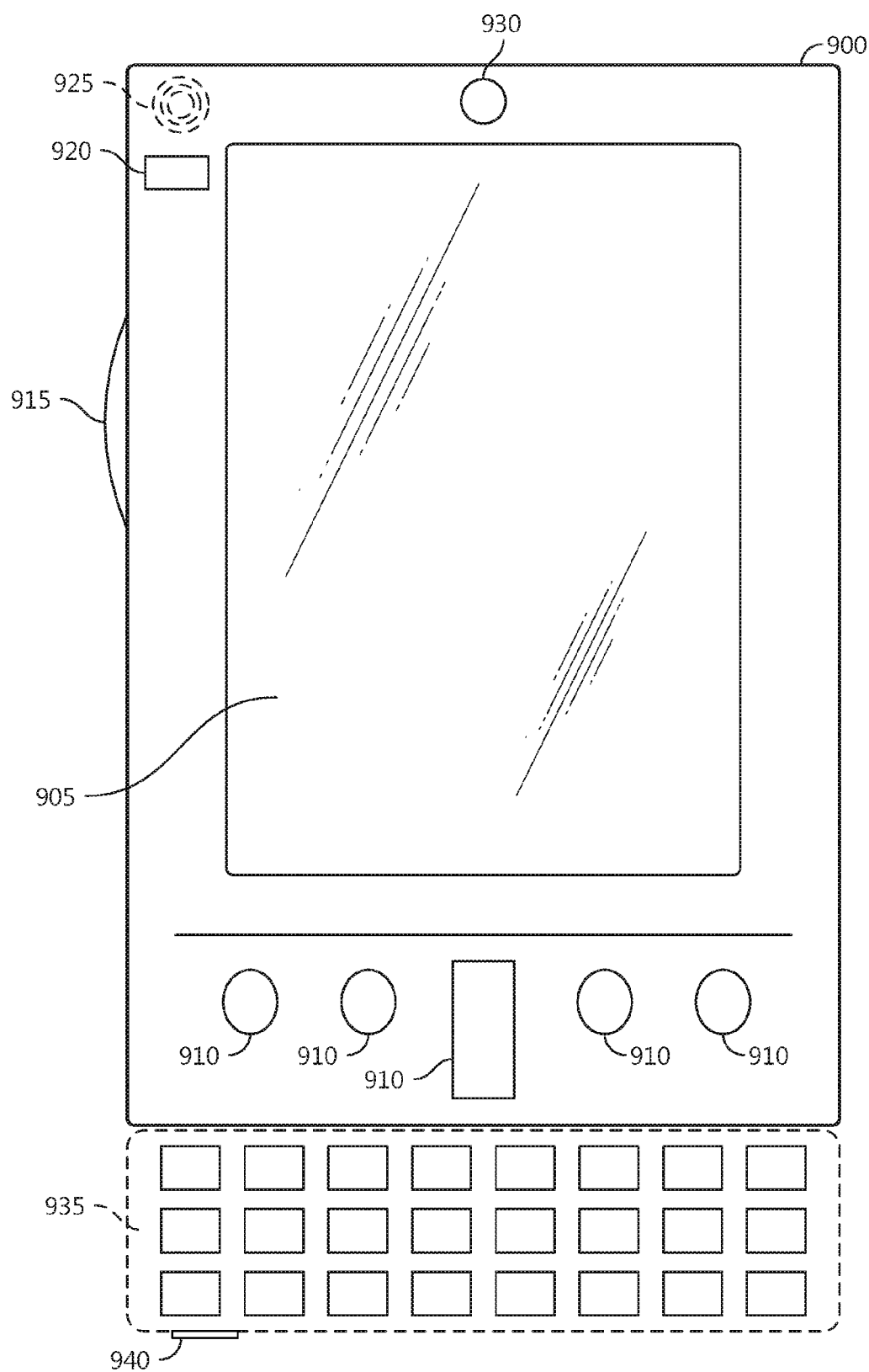
FIGS. 9A and 9B are block diagrams of a mobile computing device.
Figure 9B:
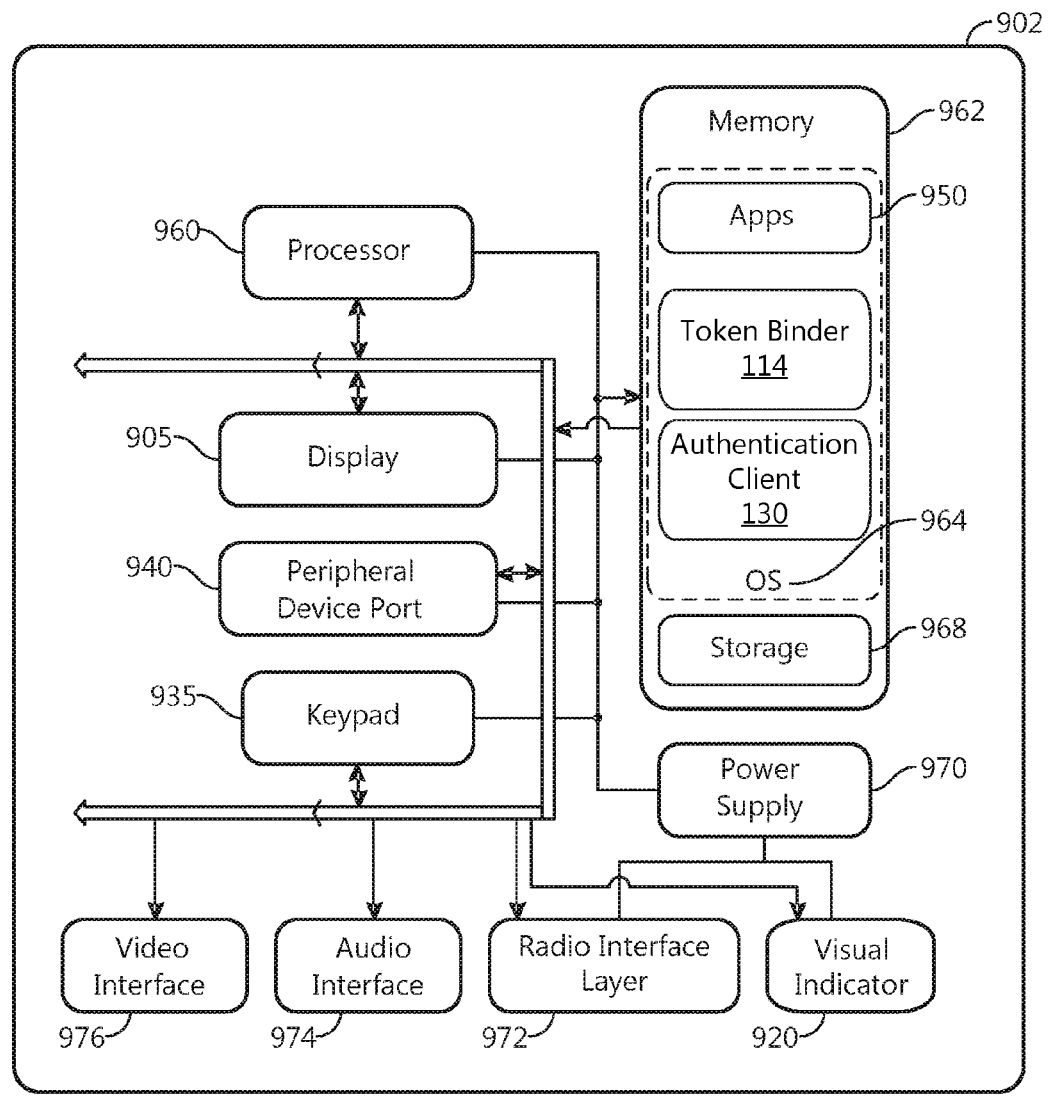
Figure 10:
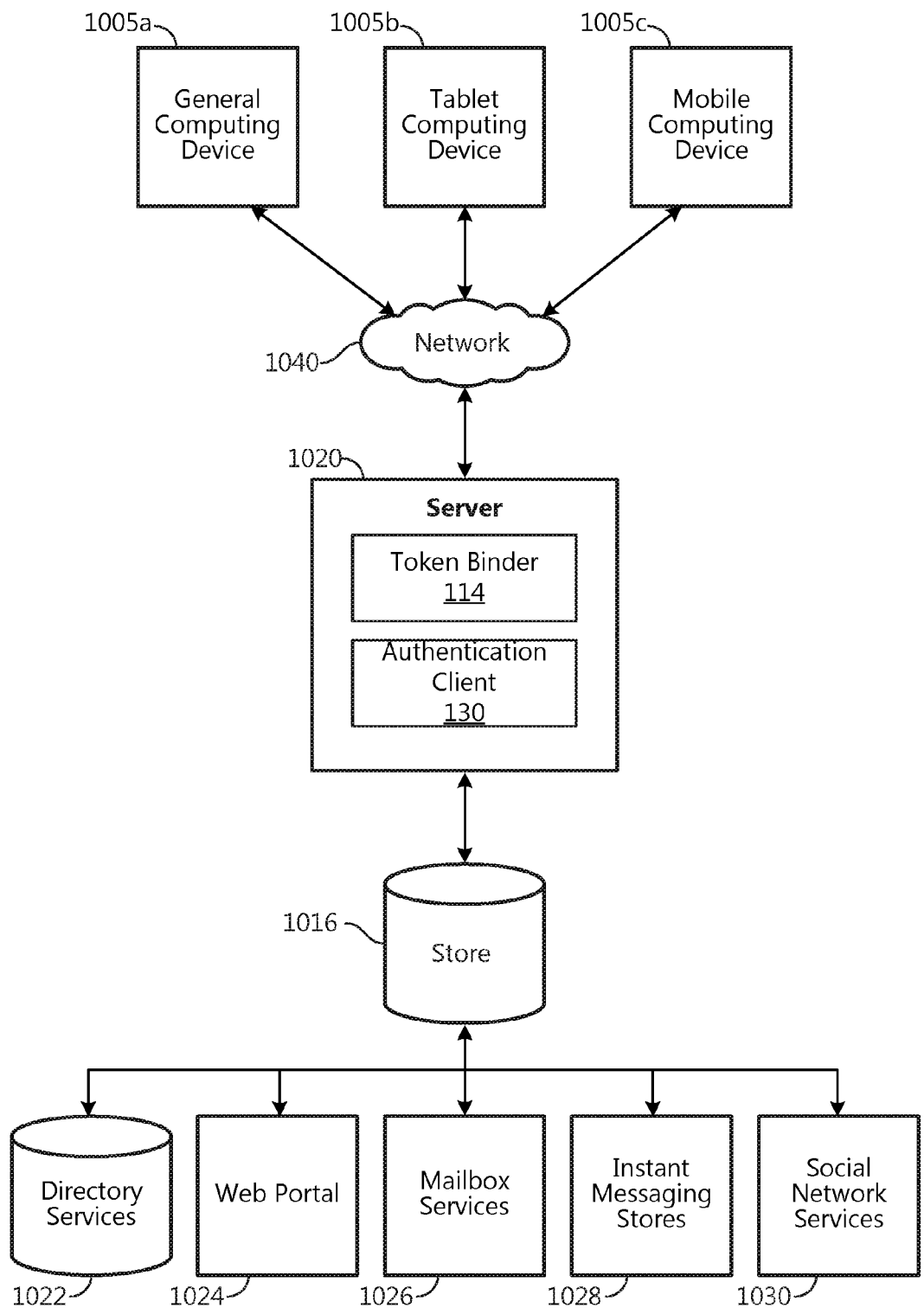
FIG. 10 is a block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are used for practicing aspects, described herein.

FIG. 8 is a diagram illustrating physical components (i.e., hardware) of a computing device 800 with which examples of the present disclosure are to be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the token binder 114 and authentication client 130. The operating system 805, for example, is suitable for controlling the operation of the computing device 800. Furthermore, aspects are practiced in conjunction with a graphics library, other operating systems, or any other application program, and is not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., token binder 114, authentication client 130) perform processes including, but not limited to, one or more of the stages of the method 700 illustrated in FIGS. 7A-E. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or fewer input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the token binder 114 and authentication client 130 are loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that are accessible by the device via the radio 972 or via a wired connection between the mobile computing device 900 and a separate computing device associated with the mobile computing device 900, for example, a server computer in a distributed computing network, such as the Internet. As should be appreciated, such data/information is accessible via the mobile computing device 900 via the radio 972 or via a distributed computing network. Similarly, according to an aspect, such data/information is readily transferred between computing devices for storage and use according to wellknown data/information transfer and storage means, including electronic mail and collaborative data/information sharing systems.

FIG. 10 illustrates one example of the architecture of a system for binding tokens as described above. Content developed, interacted with, or edited in association with the token binder 114 or authentication client 130 is enabled to be stored in different communication channels or other storage types. For example, various documents may be stored using a directory service 1022, a web portal 1024, a mailbox service 1026, an instant messaging store 1028, or a social networking site 1030. The token binder 114 or authentication client 130 is operative to use any of these types of systems or the like for binding tokens, as described herein. According to an aspect, a server 1020 provides the token binder 114 to clients 1005a,b,c (generally, clients 1005). As one example, the server 1020 is a web server providing the token binder 114 or authentication client 130 over the web. The server 1020 provides the token binder 114 or authentication client 130 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for binding a ticket granting ticket to a client computing device, comprising:
   establishing a binding key, wherein the binding key is a shared secret between the client and a security token service (STS), wherein the binding key is bound to the client;
   wherein the binding key is protected by a token binder comprising a trusted platform module (TPM) and key storage;
   generating a request message for obtaining a security token;
   deriving a first request signing key, wherein the first request signing key is a message authentication code (MAC) key for signing the request message, and is derived based on a pseudorandom function, the binding key, and a first client-generated nonce;
   constructing a first MAC function based on a pseudorandom function and the first request signing key;
   generating a MAC for authentication of the request message using the first MAC function;
   concatenating the request message, the MAC, and the first client-generated nonce;
   transmitting the concatenation to the STS for authentication of the client; and
   upon authentication of the client by the STS, generating an security token for client access of remote protected resources,
   wherein the security token, upon receipt at the client, is bound to one or more of the token binders.

2. The method of claim 1, further comprising, in response to the request message, receiving, from the STS, a response message, wherein at least a portion of the response message is encrypted using a symmetric key cypher with a first response encryption key derived based on a pseudorandom function, the binding key, and a first STS-generated nonce, and wherein the response message includes a MAC generated by an STS-constructed MAC function based on a pseudorandom function, a first response signing key derived based on a pseudorandom function, the binding key, and a second STS-generated nonce.

3. The method of claim 2, wherein the response message includes the requested security token, the first STS-generated nonce, and the second STS-generated nonce.

4. The method of claim 3, further comprising:
   deriving the first response signing key based on a pseudorandom function, the binding key, and the second STS-generated nonce;
   constructing a second MAC function based on a pseudorandom function and the first response signing key;
   generating a MAC for authentication of the response message using the second MAC function;
   comparing the client-generated MAC to the STS-generated MAC included in the response message to determine whether the client-generated MAC and the STS-generated MAC match; and
   in response to a positive determination, authenticating the response message.

5. The method of claim 4, further comprising:
   deriving the first response encryption key based on a pseudorandom function, the binding key, and the first STS-generated nonce;
   decrypting at least a portion of the response message using a symmetric key cipher and the first response encryption key;
   identifying the requested security token; and
   storing the requested security token.

6. The method of claim 5, wherein generating a request message for obtaining a security token comprises generating a service token request message for obtaining a service token.

7. The method of claim 6, wherein generating a service token request message comprises including the ticket granting ticket in the service token request message.

8. The method of claim 6, wherein identifying and storing the requested security token comprises identifying and storing the service token.

9. The method of claim 8, further comprising transmitting the service token to a service provider to access a particular service provided by the service provider.

10. The method of claim 1, wherein generating a request message for obtaining a security token comprises generating an authentication request message for obtaining the ticket granting ticket.

11. A method of binding a ticket granting ticket to a client computing device, comprising:
   establishing a plurality of binding keys, wherein each of the plurality of binding keys is protected by a token binder associated with the client, and is a shared secret between the client and a security token service (STS);
   wherein each token binder comprises a trusted platform module (TPM) and key storage;
   generating a request message for obtaining a security token;
   deriving, by a first token binder, an intermediate key, wherein the intermediate key is derived based on a pseudorandom function, a binding key protected by the first token binder, and a first client-generated nonce;
   providing the intermediate key to a second token binder;
   deriving, by the second token binder, a request chaining key, wherein the request chaining key is derived based on a pseudorandom function, a binding key protected by the second token binder, and the intermediate key;
   constructing a first message authentication code (MAC) function based on a pseudorandom function and the request chaining key;
   generating a MAC for authentication of the request message using the first hash function;
   concatenating the request message, the MAC, and the first client-generated nonce;
   transmitting the concatenation to the STS for authentication of the client; and
   upon authentication of the client by the STS, generating a security token for client access of remote protected resources,
   wherein the security token, upon receipt at the client, is bound to one or more of the token binders.

12. The method of claim 11, further comprising, in response to the request message, receiving, from the STS, a response message, wherein at least a portion of the response message is encrypted with a chained encryption key derived based on a pseudorandom function, a second binding key, and an intermediate encryption key, wherein the intermediate encryption key is derived based on a pseudorandom function, a first binding key, and a first STS-generated nonce.

13. The method of claim 12, wherein receiving the response message comprises receiving the response message including a MAC generated by an STS-constructed MAC function based on a pseudorandom function, the second binding key, and an intermediate response signing key, wherein the intermediate response signing key is derived based on a pseudorandom function, the first binding key, and a second STS-generated nonce.

14. The method of claim 13, wherein receiving the response message comprises receiving the response message including the requested security token, the first STS-generated nonce, and the second STS-generated nonce.

15. The method of claim 14, further comprising:
   deriving the chained encryption key derived based on a pseudorandom function, the second binding key, and the intermediate encryption key, wherein the intermediate encryption key is derived based on a pseudorandom function, the first binding key, and the first STS-generated nonce;
   decrypting at least a portion of the response message using a symmetric key cipher and the chained encryption key;
   identifying the requested security token; and
   storing the requested security token.

16. A system for binding a ticket granting ticket to a client computing device, comprising:
   one or more processors for executing programmed instructions;
   memory, coupled to the one or more processors, for storing program instruction steps for execution by the computer processor;
   at least one token binder operative to secure a binding key, wherein the binding key is a shared secret between the client and a security token service (STS), wherein the binding key is protected by the token binder comprising a trusted platform module (TPM) and key storage; and
   wherein the token binder comprises a key generator operative to derive a first request signing key, wherein the first request signing key is a message authentication code (MAC) key for signing a request message for obtaining a security token, and wherein the first request signing key is derived based on a pseudorandom function, the binding key, and a first client-generated nonce; and
   an authentication client comprising:
   a nonce generator operative to generate nonces, including the first client-generated nonce;
   a MAC generator operative to:
      construct a first MAC function based on a pseudorandom function and the first request signing key; and
      generate a MAC for authentication of the request message using the first MAC function; and
   a concatenator operative to concatenate the request message, the MAC, and the first client-generated nonce;
   an input/output (I/O) interface operative to transmit the concatenation to the STS for authentication of the client; and
   an encryptor/decryptor operative, upon authentication of the client, to encrypt the security token for sending to the client for client access of remote protected resources,
   wherein the security token, upon receipt at the client, is bound to one or more of the token binders.

17. The system of claim 16, wherein the authentication client is further operative to receive, from the STS, a response message comprising the requested security token, a first STS-generated nonce, and a second STS-generated nonce, and wherein at least a portion of the response message is encrypted with a first response encryption key derived based on a pseudorandom function, the binding key, and the first STS-generated nonce, and wherein the response message includes a MAC generated by an STS-constructed MAC function based on a pseudorandom function, a first response signing key derived based on a pseudorandom function, the binding key, and the second STS-generated nonce.

18. The system of claim 17, wherein:
   the key generator is further operative to derive the first response encryption key based on a pseudorandom function, the binding key, and the first STS-generated nonce;
   the encryptor/decryptor is operative to decrypt at least a portion of the response message using a symmetric key cipher and the first response encryption key;
   the authentication client is further operative to identify the requested security token; and the token binder is further operative to store the requested security token.

19. The system of claim 17, wherein:

the key generator is further operative to derive the first response signing key based on a pseudorandom function, the binding key, and the second STS-generated nonce;

the MAC generator is further operative to:
- construct a second MAC function based on a pseudorandom function and the first response signing key; and
- generate a MAC for authentication of the response message using the second hash function; and the authentication client comprises an authenticator operative to:
- compare the client-generated MAC to the STS-generated MAC included in the response message to determine whether the client-generated MAC and the STS-generated MAC match; and
- in response to a positive determination, authenticate the response message.

20. The system of claim 16, wherein:

a first token binder is operative to:
- derive, by the key generator, an intermediate key, wherein the intermediate key is derived based on a pseudorandom function, a binding key protected by the first token binder, and a first client-generated nonce; and
- provide the intermediate key to a second token binder;

the second token binder is operative to:
- derive, by the key generator, a request chaining key, wherein the request chaining key is derived based on a pseudorandom function, a binding key protected by the second token binder, and the intermediate key; and the authentication client is further operative to:
- construct, by the MAC generator, a first MAC function based on a pseudorandom function and the request chaining key;
- generate, by the MAC generator, a MAC for authentication of the request message using the first hash function;
- concatenate, by the concatenator, the request message, the MAC, and the first client-generated nonce; and
- transmit, by the I/O interface, the concatenation to the STS to obtain the security token.

* * * * *